US009071867B1

(12) United States Patent  
Ray et al.

(10) Patent No.: US 9,071,867 B1
(45) Date of Patent: Jun. 30, 2015

(54) DELAYING AUTOMATIC PLAYING OF A VIDEO BASED ON VISIBILITY OF THE VIDEO

(71) Applicant: Google Inc., Mountain View, CA (US)

(72) Inventors: Jonathan William Ray, Venice, CA (US); Justin Lewis, Marina del Rey, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/944,557

(22) Filed: Jul. 17, 2013

(51) Int. Cl.  
*H04N 21/44* (2011.01)  
*H04N 21/466* (2011.01)  
*H04N 21/475* (2011.01)  
*H04N 21/442* (2011.01)  
*H04N 21/45* (2011.01)  
*H04N 21/258* (2011.01)  
*H04N 21/422* (2011.01)  
*H04N 21/25* (2011.01)  
*H04N 21/418* (2011.01)

(52) U.S. Cl.  
CPC ....... *H04N 21/44008* (2013.01); *H04N 21/466* (2013.01); *H04N 21/4755* (2013.01); *H04N 21/44218* (2013.01); *H04N 21/45* (2013.01); *H04N 21/258* (2013.01); *H04N 21/4532* (2013.01); *H04N 21/475* (2013.01); *H04N 21/42201* (2013.01); *H04N 21/25891* (2013.01); *H04N 21/251* (2013.01); *H04N 21/4182* (2013.01)

(58) Field of Classification Search  
None  
See application file for complete search history.

(56) References Cited

U.S. PATENT DOCUMENTS

| 6,363,204 | B1 * | 3/2002 | Johnson et al. | 386/230 |
| 8,396,746 | B1 * | 3/2013 | Wang | 705/14.69 |
| 2002/0108115 | A1 * | 8/2002 | Palmer | 725/50 |
| 2006/0256133 | A1 * | 11/2006 | Rosenberg | 345/619 |
| 2008/0288876 | A1 * | 11/2008 | Fleming | 715/761 |
| 2010/0011392 | A1 * | 1/2010 | Bronstein et al. | 725/28 |
| 2010/0153544 | A1 * | 6/2010 | Krassner et al. | 709/224 |
| 2011/0176790 | A1 * | 7/2011 | Morris | 386/299 |
| 2011/0197225 | A1 * | 8/2011 | Kitashou | 725/37 |
| 2012/0116897 | A1 * | 5/2012 | Klinger et al. | 705/14.73 |
| 2012/0219265 | A1 * | 8/2012 | Sriganesh et al. | 386/230 |
| 2013/0177891 | A1 * | 7/2013 | Hammerschmidt | 434/309 |
| 2014/0157333 | A1 * | 6/2014 | Daniel et al. | 725/81 |

* cited by examiner

*Primary Examiner* — Justin Shepard  
(74) *Attorney, Agent, or Firm* — Amin, Turocy & Watson, LLP

(57) ABSTRACT

Systems and methods for delaying automatic playing of a video based on visibility of the video are presented. In one or more aspects, a system is provided that includes a visibility component configured to determine degree of visibility of a video, or representation of the video, to a user as displayed in a user interface generated at a client device, and an auto-play component configured to delay automatic playing of the video based in part on the degree of visibility being below a threshold.

19 Claims, 18 Drawing Sheets

DELAYING AUTOMATIC PLAYING OF A VIDEO BASED ON VISIBILITY OF THE VIDEO

TECHNICAL FIELD

This application generally relates to systems and methods for delaying automatic playing of a video based on visibility of the video.

BACKGROUND

The proliferation of available streaming video is increasing at exponential levels that will soon reach many millions if not billions of such viewable streaming content. Content providers often provide free streaming video content to users in exchange for association of an advertisement with the video. These advertisements are often provided in association with a primary video as a pre-roll advertisement played at initiation of playing the primary video. However, depending on manner in which a user interface displaying a video is generated and configured, the video may begin playing while being displayed in an area of the user interface that is not seen by the user. As a result, the user will not see the pre-roll advertisement.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1A:
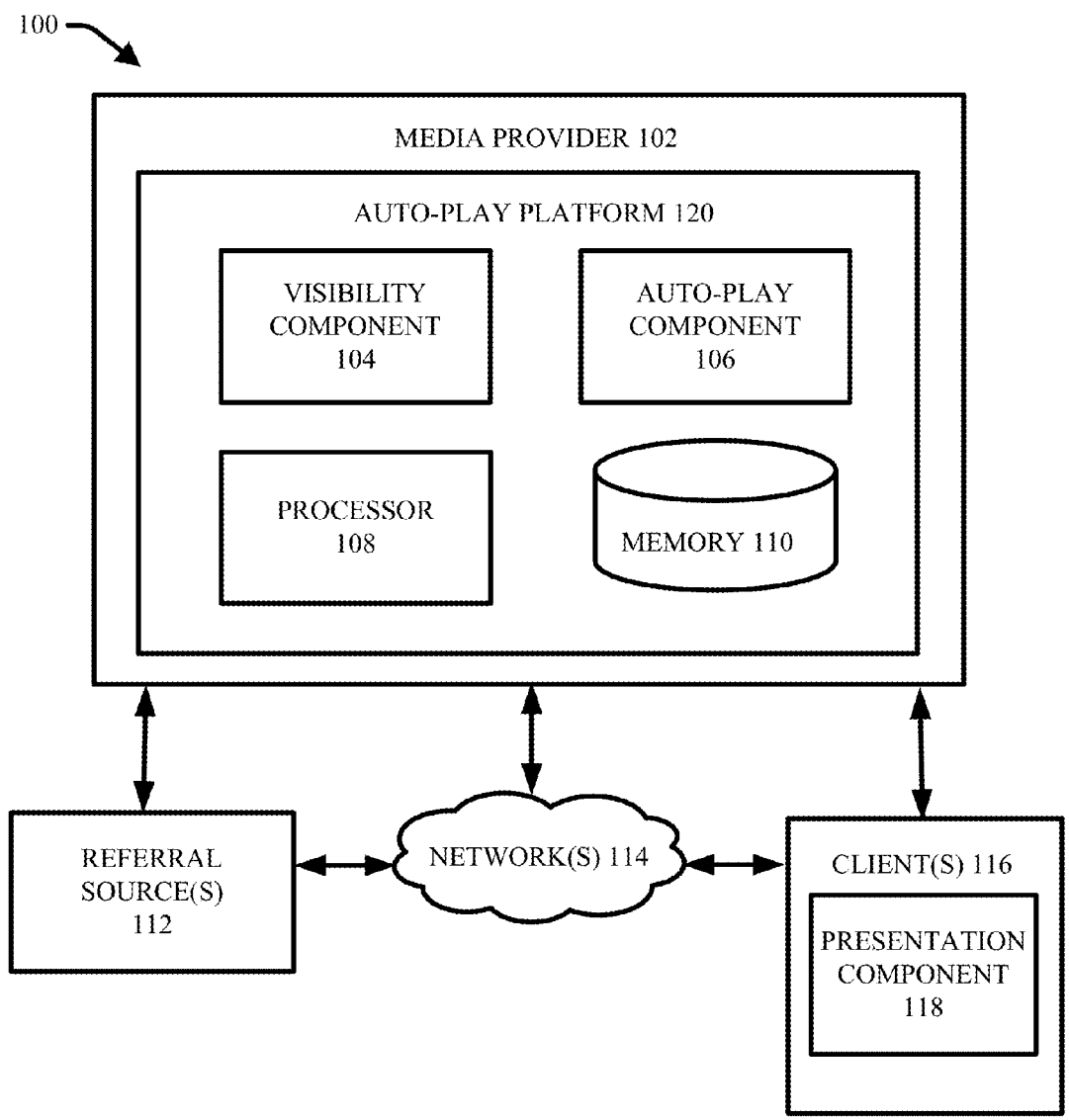
FIG. 1A illustrates an example system for delaying automatic playing of a video based on visibility of the video in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for delaying automatic playing of a video based on visibility of the video. Media providers and other systems that provide streaming video to users generally initiate streaming or playing of a video in response to selection of a play icon associated with the video. In some aspects, a media provider will automatically play videos immediately upon loading of a window or tab panel that includes and presents the video. Both techniques for initiating streaming of video have many drawbacks. For example, having to click on or select a play icon to initiate playing of a video is inconvenient for the user. Also, when a video is automatically loaded and played in a new tab following selection of a link for the video, the new tab is often loaded in the background (e.g., behind a webpage or document being displayed in a primary tab of the window at which the link is located). As a result, the user will not see the beginning of the video and bandwidth is wasted on playing a video or portion of the video that isn't seen.

In order to remedy the above noted problems, the subject disclosure presents systems and methods for delaying auto-play of a video until the video becomes visible to a user. In one or more aspects, a system is provided that includes a visibility component that detects degree of visibility of a video provided to a user via a user interface (e.g. a graphical user interface or a virtual interface) generated a client device. The visibility component can detect degree of visibility based on various parameters, including but not limited to: location of a tab panel or tabbed page open in a window of the user interface that includes the video with respect to another tabbed page open in the window, location of a first window in which the video is displayed with respect to another open window in the user interface, size of the first window with respect to the other window, and degree of user interaction with a window in which the video is displayed. The system further includes an auto-play component configured to delay automatic playing of the video based in part on the detected degree of visibility. For example, the auto-play component can delay automatic playing of a video until it becomes completely visible to a user.

In another aspect, a method is disclosed that includes using a processor to execute the following computer executable instructions stored in a memory to perform various acts. These acts can include determining degree of visibility of a video, or representation of the video, to a user as displayed in a user interface generated at a client device, and delaying automatic playing of the video based in part on the degree of visibility being below a threshold.

Further provided, is a device comprising a memory having stored thereon computer executable components and a processor that executes computer executable components. In an aspect, these components include a presentation component configured to generate a user interface comprising a representation of a video, and a reception component configured to automatically receive and play the video as streamed from another device in response to a determination that the representation of the video is visible to a user of the device via the user interface.

Referring now to the drawings, with reference initially to FIG. 1A, presented is diagram of an example system 100 for delaying automatic playing of a video based on visibility of the video, in accordance with various aspects and embodiments described herein. Aspects of systems, apparatuses or processes explained in this disclosure can constitute machine-executable components embodied within machine (s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes media provider 102, one or more referral sources 112, and one or more client devices 116. System 100 also includes one or more networks 114 for connecting the one or more client devices 116, the one or more referral sources 112 and media provider 102. In an aspect, media provider 102 can include auto-play platform 120 to control automatic playing of media (e.g., video and/or audio) provided by media provider 102. In other aspects, (not shown), auto-play platform 120 can be located externally from media provider 102 and accessed by media provider 102 over a network (e.g., a network 114). Still in yet another aspect, (not shown), auto-play platform can be located at client device 116 to control automatic playing of video streamed to client device 116 from media provider 102 and/or video stored at client device 116. Auto-play platform 120 can include memory 110 for storing computer executable components and instructions. Auto-play platform 120 can further include a processor 108 to facilitate operation of the instructions (e.g., computer executable components and instructions) by the auto-play platform 120.

Media provider 102 can include an entity that provides media content to client device(s) 116 via a network 114 (e.g., the Internet). Client device 116 can include presentation component 118 to generate and display a user interface (e.g., a graphical user interface or virtual interface) at client device 116 that displays media content provided by media provider 102. In an aspect, presentation component 118 can include an application (e.g., a web browser) for retrieving, presenting and traversing information resources on the World Wide Web. For example, media provider 102 can provide and/or present media content to client device 116 via a website that can be accessed using a browser of the client device 116. The media content can be presented to a user of client device 116 in a window of a user interface generated/displayed by the browser of the client device 116. As used herein the term media content or media item can include but is not limited to streamable media (e.g., video, live video, video advertisements, music, music videos, sound files and etc.) and static media (e.g., pictures, thumbnails). In some aspects, the term media content or media item includes a collection of media items such as a playlist including several videos or songs, or a channel including several videos or songs associated with a single media creator.

In an aspect, media provider 102 can employ one or more server computing devices to store and deliver streaming media content to users via a network 114. The media can be stored in memory 110 and/or at various servers employed by media provider 102 and accessed via client device 116 using a website platform of the media provider 102. For example, media provider 102 can include a media presentation source that has access to a voluminous quantity (and potentially an inexhaustible number) of shared media (e.g., video and/or audio) files. The media presentation source can further stream these media files to one or more users at respective client devices 116 of the one or more users over a network 114. In another example, media provider 102 can include any entity that provides videos to users along with other content and services (e.g., a social networking website that provides social networking services and social videos or an educational website that provides educational videos and services).

In another aspect, media provider 102 can include an entity that provides media content that is affiliated with and stored by another media source or media provider. According to this example, media content provided by media provider 102 can be stored by and affiliated with another media provider/source (not shown) accessible to media provider 102 via a network (e.g., network 114). For example, media provider 102 can include a social networking website or other type of networked content provider that provides links to videos or includes embedded videos provided by another media provider/source (not shown), such as a media presentation source that has access to a voluminous quantity (and potentially an inexhaustible number) of shared media (e.g., video and/or audio) files.

Referral source 112 can include an information source accessible to client devices 116 via a network 114 that provides a link or hyperlink to media content provided by media provider 102. Selection of the link or hyperlink by a user or application of client device 116 can cause the media content represented by the link or hyperlink to open or otherwise be provided to the user at the client device 116. For example, referral source 112 can include a networked content source that provides information to a user via a website and includes embedded links to media provided by media provider 102. An example referral source can include a social networking services website, a website that compiles photos and/or links to information found interesting to users at various other websites, a website that provides news articles and news multimedia to users, a website that complies photos, a website that provides written reviews of places and things, a website that provides products for purchasing, or a website that provides educational services and information. It should be appreciated that the types of referral sources described above are merely exemplary and that system 100 (and additional systems described herein) can be employed with a vast array of referral sources.

Client device 116 can include any suitable computing device associated with a user and configured to interact with media provider 102, referral source 112 and/or auto-play platform 120. For example, client device 116 can include a desktop computer, a laptop computer, a television, a mobile phone, a tablet personal computer (PC), or a personal digital assistant PDA. As used in this disclosure, the terms "content consumer" or "user" refer to a person, entity, system, or combination thereof that employs system 100 (or additional systems described in this disclosure) using client device 116. Network(s) 114 can include wired and wireless networks, including but not limited to, a cellular network, a wide area network (WAD, e.g., the Internet), a local area network (LAN), or a personal area network (PAN). For example, client device 116 can communicate with a referral source 112 and media provider 102 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

Auto-play platform 120 is configured to control automatic playing of media provided by media provider 102 as a function of degree of visibility of the media to a user of a client device 116 at which the media is presented. For example, a video provided by media provider 102 can be presented at client device 116 in a webpage that is displayed in a window or tab panel of a user interface generated at the client device 116. In some aspects, the video can be configured to automatically begin playing in response to opening of the window or tab panel or loading of the webpage within the window or tab panel. However, the video may not be visible to a user for various reasons. For example, the video may be provided in a window or tab panel that is behind another window or tab panel. In another example, the video may be provided in window or tab panel that is minimized or that is too small to accommodate clear visibility. In another aspect, the video may be displayed in an embedded video player of a displayed webpage and the embedded video player may be located in a non-visible portion of the webpage. For example, the embedded video player may be located at a position of a scrollable webpage that is brought to view in response to scrolling down or up. In another example, the video player may be located in an embedded player that is outside of the display area of the user interface based on a size of the loaded webpage.

Auto-play platform 120 includes visibility component 104 to determine degree of visibility of media (e.g., video) provided to a user in a user interface of client device 116. In particular, visibility component 104 is configured to determine whether a video or representation of the video (e.g., a still image of the video, thumbnail of the video, a paused video within a video player, etc.) is visible to a user of a client device 116 as displayed within a user interface generated at client device 116. Auto-play platform 120 includes auto-play component 106 to delay automatic playing of a video until visibility component 104 has determined that the video, or representation of the video, is visible to the user of client device 116.

In an aspect, visibility component 104 determines degree to which a video or representation of the video is visible to a user, referred to herein as degree of visibility. For example, a video can be entirely visible (e.g., 100% visible) or entirely not visible (e.g., 0% visible). In another example, a video can be partially visible (e.g., 30% visible, 50% visible, 70% visible, etc.). According to this aspect, auto-play component 106 is configured to delay automatic playing of a video based on the determined degree of visibility of the video or representation of the video. For example, auto-play component 106 can delay automatic playing of a video in response to the degree of visibility being below a predetermined threshold (e.g., below 100% visibility, below 90% visibility, below 50% visibility, etc.). Auto-play component 106 can further be configured to initiate automatic playing of a video in response to the degree of visibility being above a predetermined threshold (e.g., above 50% visibility, above 75% visibility, above 99.9% visibility, etc.).

Visibility component 104 is configured to determine degree of visibility of a video or representation of a video based on a variety of factors. In an aspect, visibility component 104 determines degree of visibility of a video, or representation of a video, provided in a window and/or tab of a user interface generated at client device 116 based on one or more of the following criteria: number of windows and/or tabs open in the user interface, arrangement of one or more windows and/or tabs open in the user interface, size of one or more windows and/or tabs open in the user interface, location of a video player including the video or representation of the video within a document or webpage provided in the window and/or tab open in the user interface, sizing of the contents of the document or webpage (e.g., zoom in or zoom out) having the video player, and dimensions and limitations of the display screen of the client device 116 at which the user interface is generated.

For example, a hyperlink, (such as a link located at a referral source 112 to a video provided by media provider 102), can be opened in several modes that cause the information represented by the hyperlink to be rendered in various manners. For instance, the manner in which a video represented by a hyperlink is provided/presented to a user at a client device 116 can depend on the browser employed to view and open the hyperlink, the type of hyperlink, the formatting of the hyperlink, and the command applied to open the hyperlink. Many browsers employed to access and open hyperlinks present information using windows and tabs. These windows and tabs can be displayed in various arrangements, numbers and sizes in a user interface. Depending on the mode in which a hyperlink is opened, media content represented by the hyperlink can be provided by the browser in a window or tab that may not be visible to a user. In an aspect, auto-play platform 120 is configured to delay automatic playing of a video opened from a hyperlink until the video becomes visible to a user based on position and size of the window and/or tab panel in which the video is displayed.

A window is a section or area of a user interface that displays information, with its contents being displayed independently from the rest of the interface. For example, a window can display a webpage, an application, or a program. In an aspect, media content provided by media provider 102 is presented to a user in a browser window (e.g., a window opened and generated by a browser) displayed a user interface. Certain operating systems allow multiple windows to be open at one time, in which case each window can display a different application or file. In some aspects, windows can be manipulated by a user. For example, some windows allow a user to change the size of the window, minimize or maximize the window, move the window about the interface at which it is displayed, or place the window in front of or behind another window.

A tab is a design tool that allows multiple pages or documents to be displayed in a single window using tabs as a navigational widget for switching between pages or documents. For example, a webpage or document can be displayed on a single tab panel in a window and a window can include multiple tab panels layered over one another. In order to view a tab panel included in a window having multiple open tab panels, a user can select a tab widget associated with the tab panel to bring the tab panel to the forefront of the window (e.g., in front of or on top of the other open tabs). In an aspect, media content provided by media provider 102 is presented to a user in association with a tab of a window (e.g., a window opened and generated by a browser). Because a tabbed user interface holds many different documents or pages logically under one window, the primary operating system interface is free of the clutter that would be created by a large number of small child windows. Another advantage is that sets of related documents or pages can be grouped within a single window. Certain web browsers that use tab panels to present different webpages often allow users to save their browsing session and return to it later. For example, when a user opens a browser, the previous browsing session of the user, including a window with several open tabs, is presented to the user.

Links or hyperlinks provided at a referral source 112 to media content provided by a media provider 102 can be opened in various modes as noted above. In an aspect, a link to the media content is opened in a new window that is positioned in front of or in back of a window at which the link is located. In another aspect, a link to media content is opened in the same window and tab which the link is located. For example, selection of a link to media content can cause a video player to open within the webpage at which the link was located. In yet another aspect, a link to the media content is opened in a new tab panel associated with a window at which the link is located. According to this aspect, the link to the media content can be provided at a webpage or document displayed at a first tab panel of a window. In response to selection of the link, the media content is loaded on a new webpage or document that is opened in a second tab panel of the window. In an aspect, the second tab panel is located behind the first tab panel and hidden by the first tab panel. In order to view or activate the second tab panel, a user can select the tab associated with the tab panel to bring the second tab panel in front of the first tab panel, (e.g., the second tab panel is loaded in the background and remains in the background until the user switches to it). In another aspect, the second tab panel can be loaded in front of the first tab panel.

In an aspect, visibility component 104 is configured to analyze a user interface generated at client device 116 and determine relative sizes and positions of one or more windows and tab panels displayed in the user interface. If a window or tab panel includes a video or representation of a video, visibility component 104 can determine degree of visibility of the video or representation of the video based in part on the position and size of the window or panel within the user interface and based on the position and size of the window or panel with respect to other windows and/or panels displayed in the user interface. For example, where a video or representation of a video is provided in a first tab panel of a window, visibility component 104 can determine that the video or representation of the video is 100% visible because the first tab panel is located in front of other tab panels open in the window. In another example, where a video or representation of a video is provided in a first window, visibility component 104 can determine that that the video or representation of the video is 100% visible because the first window is the only window open and/or because the first window is located in front of all other windows open in the user interface. Still in yet another example, where a video or representation of the video is provided in a window that is positioned partially off-screen, visibility component 104 can determine that that the video or representation of the video is partially visible based on the degree to which the window is off-screen.

It should be appreciated that various configurations of windows and tabs can be generated in a user interface that can affect the degree of visibility of a video or representation of a video provided in one or more of the windows or tabs. For example, a user interface can include a plurality of open windows, some of which having a plurality of open tabs. The windows can have various shapes and sizes and be positioned about the user interface entirely overlapping one another, partially overlapping one another, and/or not overlapping one another. A window can also be positioned in the user interface such that the window or a part of the window is off-screen. A window can further be minimized or maximized.

Visibility component 104 can consider these various possible configurations of windows and tabs and relationships between windows and tabs to determine a degree of visibility of a video or representation of a video. For example, where a video or representation of a video is provided in a first window that is partially covered by another window, visibility component 104 can determine that the video or representation of the video, is partially visible (e.g., the video or representation of the video has a degree of visibility that is <100% and >0%). The visibility component 104 can apply various algorithms to calculate degree of visibility. For example, the visibility component can determine degree of visibility of the based on the amount of area of the first window that is not covered by the other window with respect to the area of the user interface. In another aspect, where a video is included in a window that has a size that makes the video difficult to see (e.g., window that is one square inch), the visibility component 104 can determine that the video is partially visible.

Visibility component 104 can also determine degree of visibility of a video or representation of a video based on a location of a video player having the video or representation of the video, within a window or tab panel displayed in a user interface. For example, a window can display a scrollable document or webpage that includes a video in a video player. The video player may or may not be visible based on position of the scrollbar and position of the video player within the document or webpage. According to this example, although the video may be included in a tab panel or window that is visible to a user, the actual video may not be visible to a user. Thus, in an aspect, visibility component 104 can determine degree of visibility of a video based on location of the video (or video player including the video) on a scrollable page/document within a window or tab panel with respect to the portion of the scrollable page/document that is displayed in the window or tab.

In an aspect, a window can present a webpage or document that includes a video player having a video or representation of the video. However, the video player may be located off-screen or partially off-screen based on the position of the window about the user interface, size of the contents of the webpage (e.g. level of zoom in or zoom out), and/or the dimensions of the display screen of the client device 116 at which the interface is generated. Visibility component 104 can further determine location of a video player about the user interface based on these criteria. For example, a video player including a video can be positioned in a bottom right corner of a webpage. When the webpage is displayed at a relatively small display screen (e.g., a smartphone display screen) at a magnification or zoom level of 150%, the video player is shifted off the display screen area. Accordingly, based on the position of the video player in the webpage, the magnification level of the webpage, and the display screen dimensions of the client device at which the webpage is displayed, visibility component 104 can determine that the video player including a video or representation of the video is not visible to the user.

In yet another aspect, visibility component 104 can determine degree of visibility of a video or representation of a video based on location of a video player having the video or representation of the video within a document/page displayed in a window and/or tab and position, size, and arrangement of other windows/tabs open in the user interface. For example, a first window can present a webpage that includes a video player and the window can be partially covered by a second window. However the portion of the first window displaying the video player may not be covered by the second window. Accordingly, visibility component 104 can determine that the video is visible.

Figure 1B:
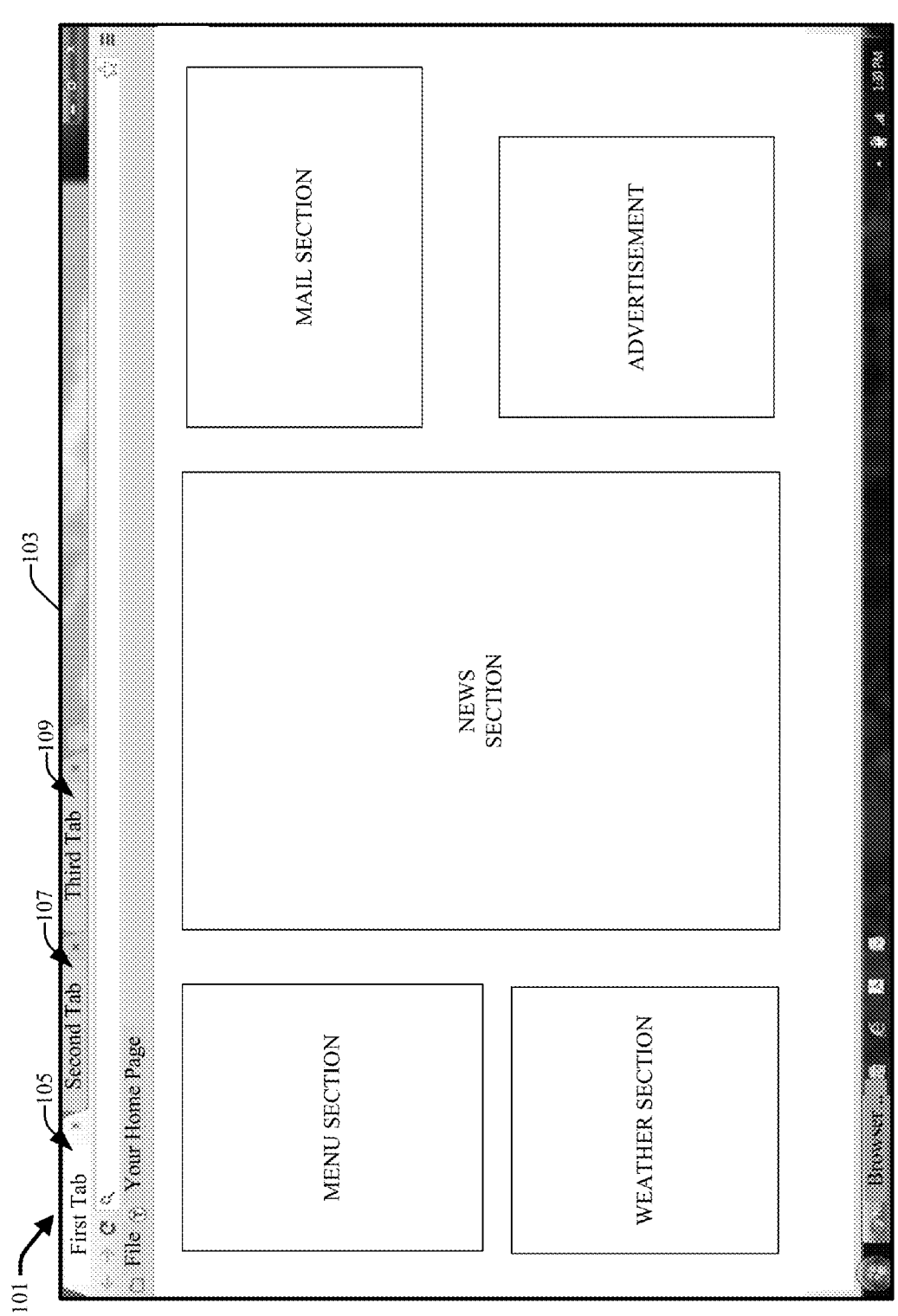
FIGS. 1B-1I present example user interfaces that demonstrate different layouts and configurations of windows and tab panels in association with effecting visibility of a video or representation of a video in accordance with various aspects and embodiments described herein.
Figure 1C:
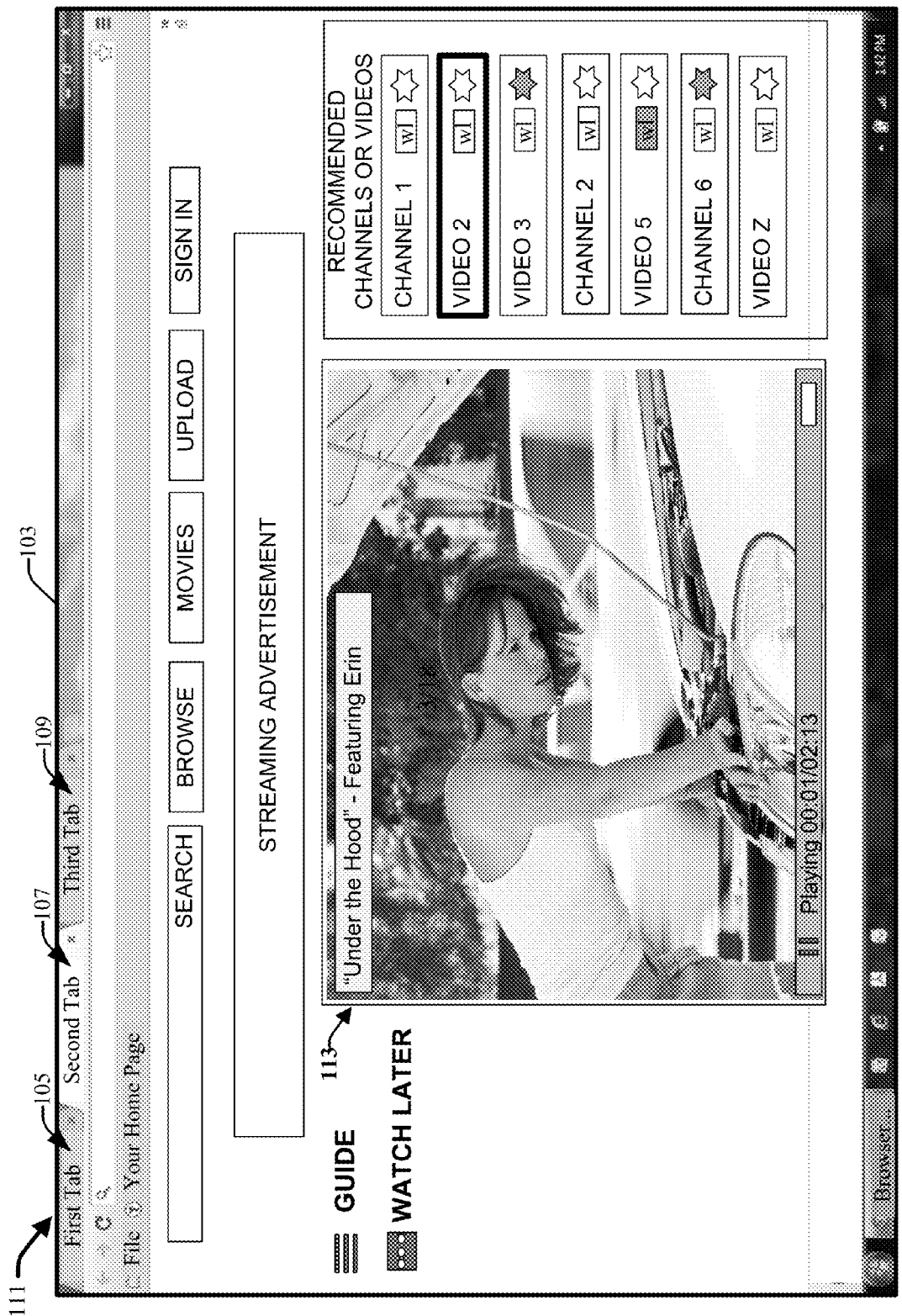

FIGS. 1B-1I depict example user interfaces generated at a client device 116 (e.g., via presentation component 118) that demonstrate different layouts and configurations of windows and tab panels in association with effecting visibility of a video or representation of a video in accordance with various aspects and embodiments described herein. FIGS. 1B and 1C present user interfaces that include a single window 103 having multiple open tabs, including first tab 105, second tab 107 and third tab 109. As seen in interface 101 of FIG. 1B, the first tab 105 is located in front of the second tab 107 and the third tab 109. The first tab 105 presents a webpage in a tab panel that completely covers the tab panels associated with the second and third tabs 107 and 109 respectively. The webpage open in the first tab panel is depicted with various generic features for exemplary purposes (e.g., a menu section, a weather section, a news section, a mail section and an advertisement).

In an aspect, the second tab 107 presents a webpage in a tab panel that includes a thumbnail of a video provided in a video player 113 associated with the webpage. For example, interface 111 presented in FIG. 1C displays the webpage provided in the tab panel of tab 107 when the second tab panel is located in front of the tab panel of first tab 105 and third tab 109 (e.g., in response to selection of the second tab 107 at interface 101). The webpage included in the second tab panel associated with second tab 107 includes a video player 113 having video or thumbnail of the video provided therein. In interface 101 of FIG. 1B, the thumbnail of the video presented in the video player 113 displayed in the webpage of the second tab panel is not visible because the second tab 107 is located behind the first tab 105. In an aspect, auto-play component 106 can delay automatic playing of the video represented by the thumbnail included in the video player 113 associated with the webpage included in the second tab panel when interface 101 is presented (e.g., when the second tab panel is behind the first tab panel causing the video player 113 to be hidden from view). In response to selection of the second tab 107 and subsequent generation of interface 111, auto-play component 106 can initiate automatic playing of the video represented by the thumbnail displayed in the video player 113.

Figure 1D:
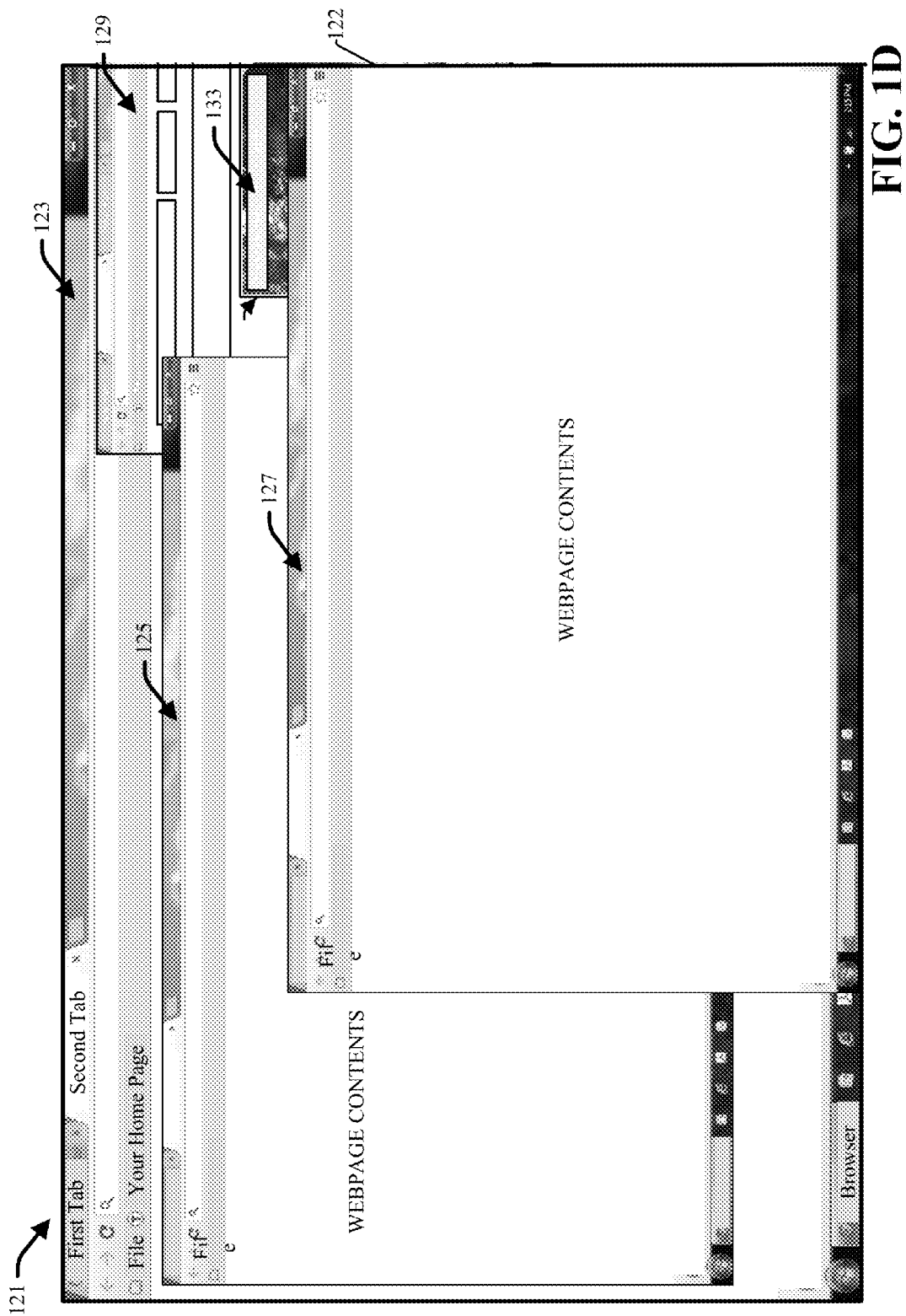
Figure 1E:
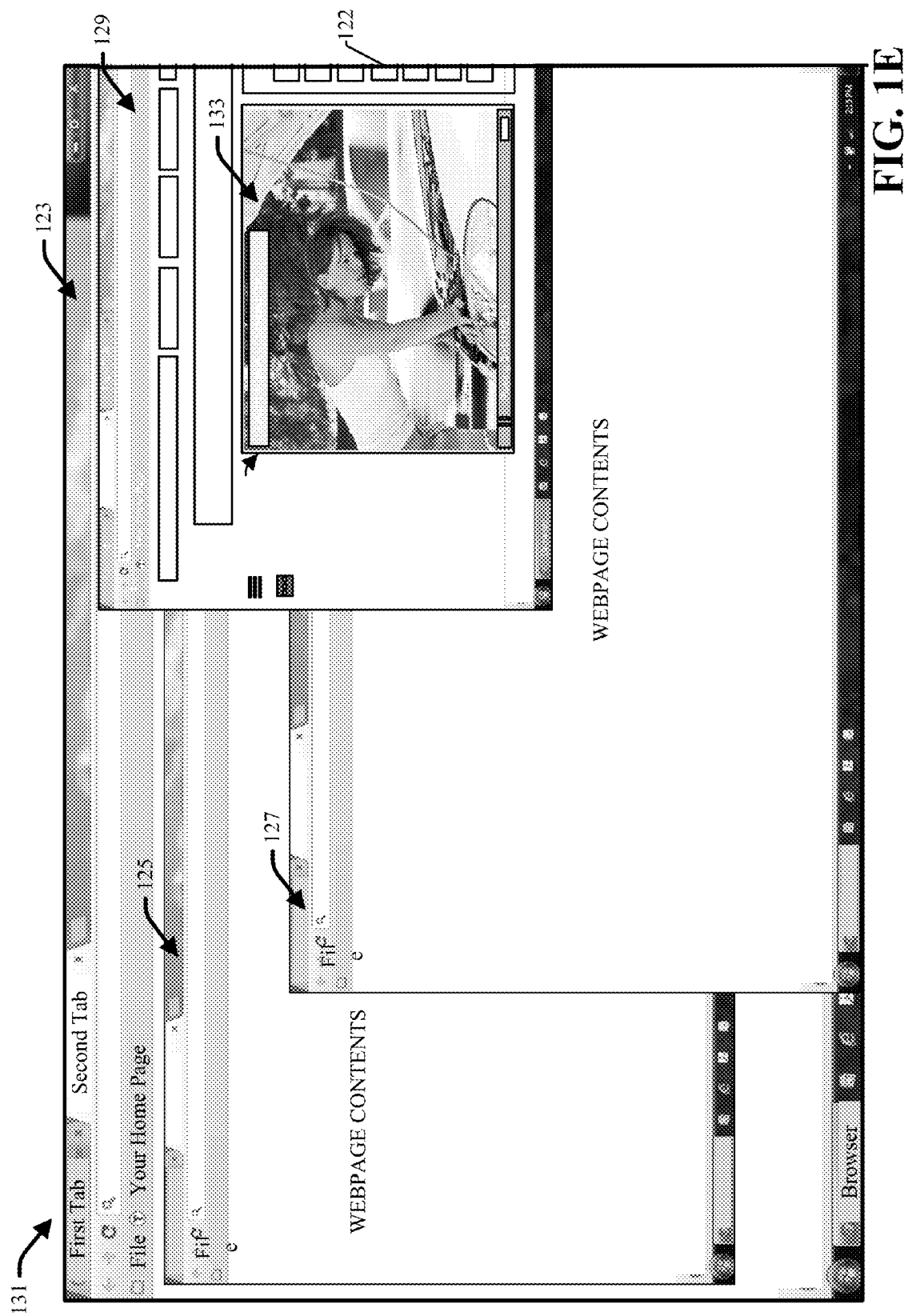

FIGS. 1D and 1E depict example user interfaces 121 and 131 that include multiple open windows of various sizes and positions about the respective user interfaces including windows 123, 125, 127 and 129. Window 129 includes a video or representation of the video 133. In interface 121, window 129, including the video/representation of the video 133, is covered in part by windows 125 and 127. In interface 121, window 129 is further positioned partially off the display screen area, represented by the bolded perimeter line 122. In an aspect, auto-play component 106 is configured to delay automatic playing of the video/representation of the video 133 as presented in interface 121 because the video/representation of the video is predominately not visible. However, as seen in interface 131, window 129 has been brought in front of windows 125 and 127 and shifted left or towards the center of the interface. As a result, the video or representation of the video 133 has become entirely visible. In an aspect, in response to the generation of interface 131, wherein the video/representation of the video 133 becomes visible, auto-play component 106 is configured to initiate automatic playing of the video 133.

Figure 1F:
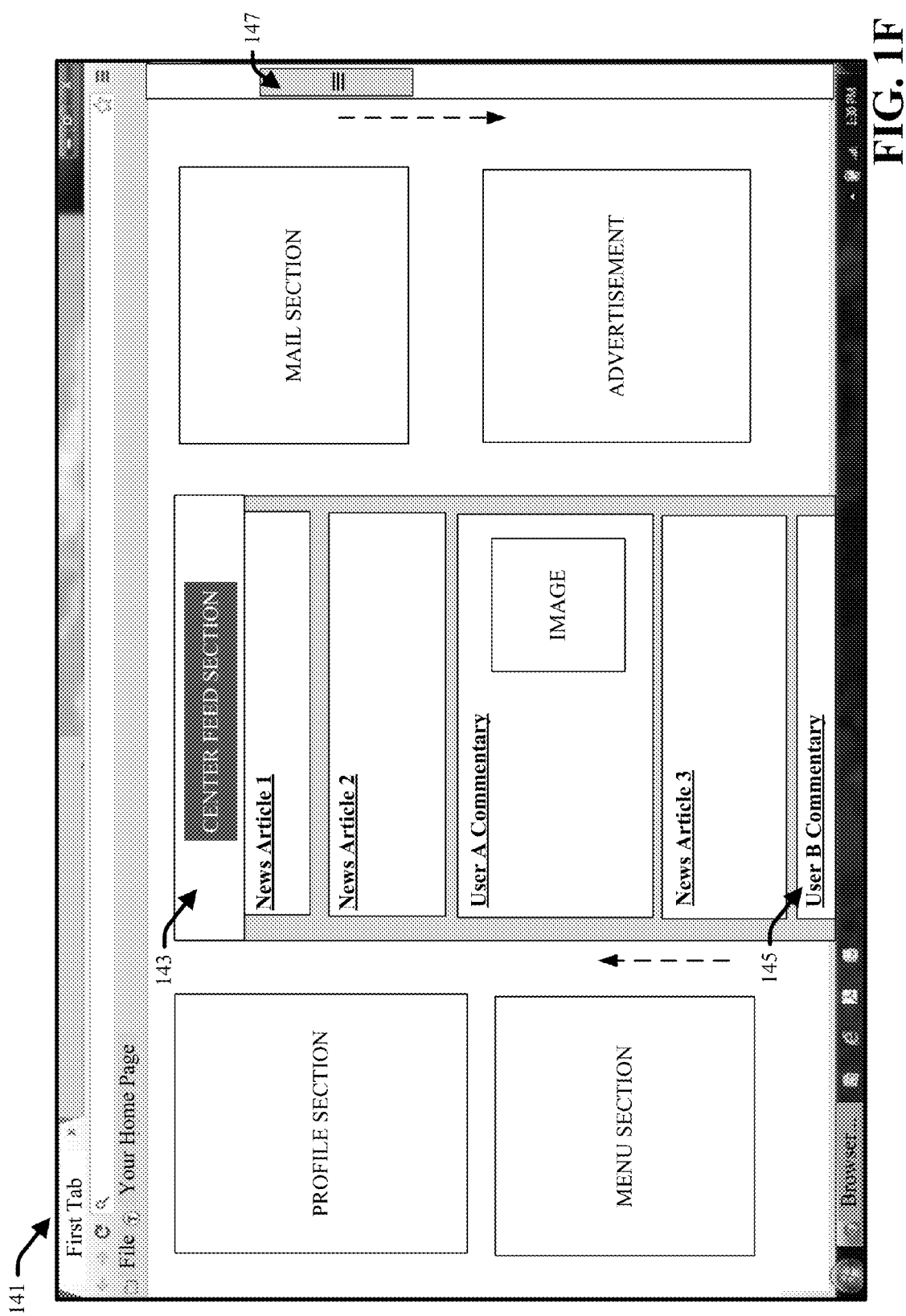
Figure 1G:
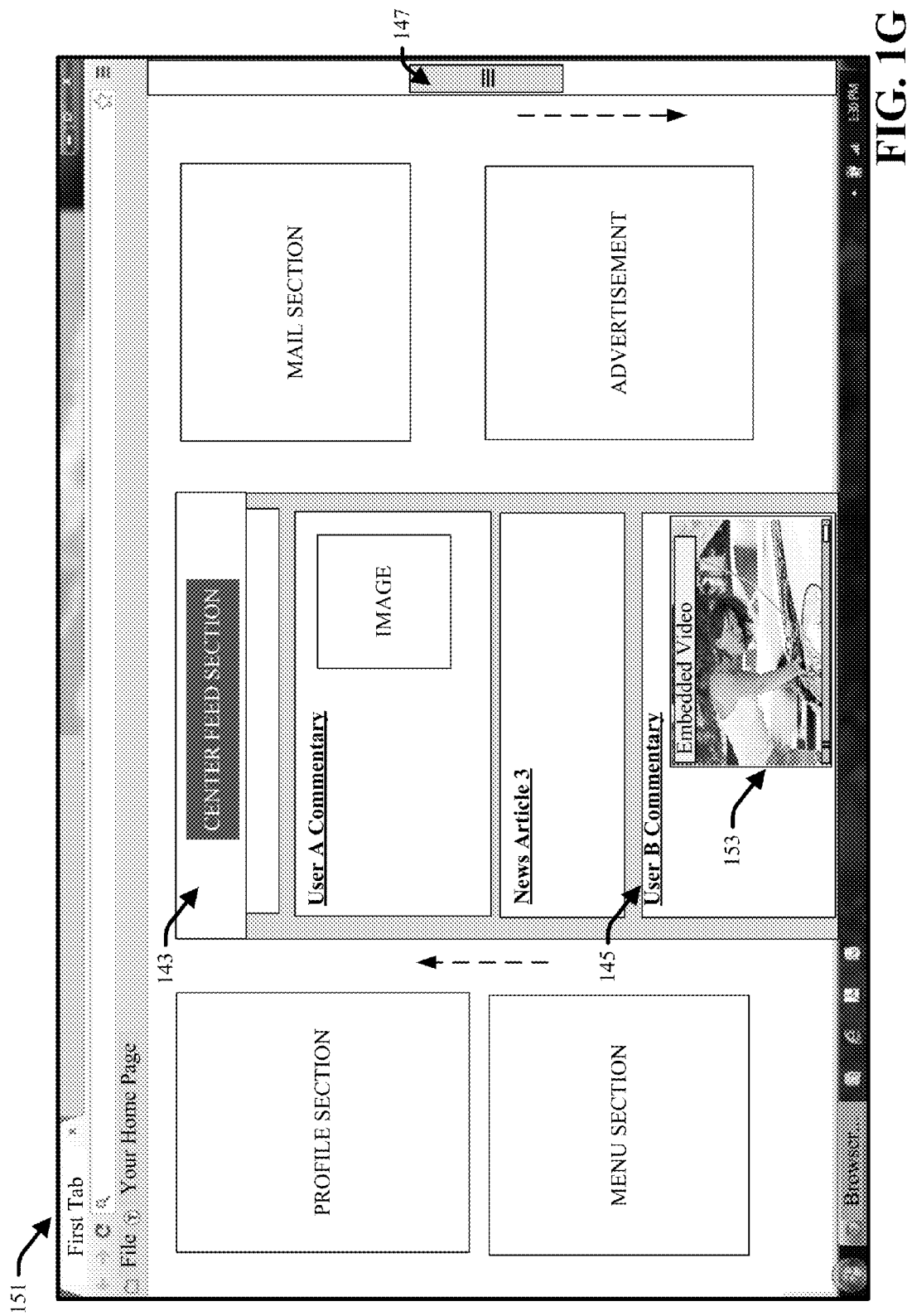
Figures 1H, 1I:

FIGS. 1F and 1G present example user interfaces 141 and 151 that include an open window displaying a webpage that includes a scrollable center feed section 143. The webpage is depicted with various other sections (e.g., profile section, menu section, mail section and advertisement) merely for exemplary purposes. In order to scroll through the contents of the center feed section 143, a user can move the scroll bar 147 located at the right side of the interface, up and down. The contents of center feed section 143 can vary. In an example implementation, contents of center feed section 143 include news articles and user commentary that can include text, images and other multimedia. In an aspect, user commentary B 145 includes an embedded video 153. The embedded video 153 is not visible in interface 141. In an aspect, the embedded video 153 associated with user commentary B is brought to view, as seen in interface 151, in response to scrolling down through the center feed 143 using scroll bar 147. In an aspect, auto-play component 106 is configured to delay automatic playing of the embedded video 153 until the video comes into view (e.g., as presented in interface 151) as a user scrolls down through the contents of the center feed section 143.

FIGS. 1F and 1G present example user interfaces 161 and 171 respectively, presented on a display screen of a smartphone client device 116. The user interfaces 161 and 171 display a webpage at various degrees of magnification. In particular, the webpage at interface 161 is displayed at a 100% magnification level 165 and the webpage at interface 171 is displayed at a 200% magnification level 167. The webpage includes a video 163. In an aspect, auto-play component 106 is configured to delay automatic playing of the video 163 until the video is displayed at a degree of visibility considered acceptable for automatic playing, as determined based in part on its size with respect to the area of the user interface/display screen.

For example, in interface 161, video 163 is of a size that is too small with respect to size of the display screen to make viewing of the video comfortable for most users. Accordingly, although the video 163 is technically visible, auto-play component 106 can delay automatic playing of the video 163 in interface 161 because its degree of visibility, as determined by visibility component 104, is less than the required degree of visibility for automatic playing (e.g., less than 30% visible as a function of the size of the video 163 with respect to the size of the display screen). However, as the video 163 is enlarged in response to magnification or zooming in on the video in interface 171, the auto-play component 106 can initiate automatic playing of the video (e.g., where visibility is greater than 30%).

Referring back to FIG. 1A, auto-play component 106 is configured to delay and initiate automatic playing of a video based on a determined degree of visibility of the video or representation of the video. In particular, once visibility component 104 determines that a video or representation of the video is visible or has a degree of visibility above a predetermined threshold (e.g., 90% visibility); auto-play component 106 can initiate automatic playing of the video. For example, auto-play component 106 can direct media provider 102 to automatically stream the video to the client device 116 at which the video is presented via a user interface generated at the client device.

For example, auto-play component 106 can delay automatic playing of a video that is loaded in a second tab panel behind a first tab panel until visibility component 104 has determined that the video or representation of the video, has become visible (e.g., in response to a brining of the second tab panel in front of the first tab panel). In another example, when employing a browser that saved a previous browsing session that included several open tab panels respectively displaying videos, the browser may re-open/load each of the tab panels associated with the previous browsing session. In response to opening each of the tab panels, the videos associated therewith may be configured to automatically begin playing, causing a chaotic scenario for the user with several videos playing at once. According to this example, auto-play component 106 can delay automatic playing of each of the videos except for the video provided in the tab panel in the forefront of the user interface (e.g. automatically play only the visible video). In yet another example, as a user is scrolling down a webpage that includes a feed, the user may come across an embedded video player including a video at some point in the feed. Visibility component 104 can determine when the video player becomes visible as the user is scrolling down the feed and the video player appears. At this time, auto-play component 106 can initiate automatic playing of the video.

In an aspect, after auto-play component 106 initiates automatic playing of a video, the video will continue to play (e.g., be streamed by media provider 102), regardless as to whether the degree of visibility of the video changes. In another aspect, auto-play component 106 can control playing of a video as a function of visibility of the video. According to this aspect, visibility component 104 can monitor visibility of a video and determine when the visibility changes. When the visibility component 104 determines that video is visible to a user, the auto-play component 106 can initiate automatic playing of the video. As the video is playing, if the video becomes not visible to the user, auto-play component 106 can pause the playing of the video until the video becomes visible again. In yet another aspect, where a video includes an audio track and a video track, auto-play component 106 can be configured to continue playing only the audio track portion of the video in response to the video becoming not visible.

In some aspects, a user interface can display more than one visible video or representation of a video. According to this aspect, auto-play component 106 can regulate automatic playing of the respective videos such that only one video plays at a time. In an aspect, where a second video is displayed in a user interface while a first video displayed in the user interface is playing and the second video is visible, auto-play component 106 can delay automatic playing of the second video until the first video has stopped playing. In another aspect, where multiple videos are displayed in a user interface, auto-play component 106 can order automatic playing of the respective videos based on the order in which the videos were displayed/opened in the user interface. In another aspect, auto-play component 106 can rank the multiple videos as a function of their relative degree of visibility, wherein videos having a greater degree of visibility are ranked higher. Auto-play component can then initiate automatic playing of the respective videos based on the order and delay automatic playing a video until the videos ranked/ordered above it have completed playing.

In addition to visibility, auto-play component 106 can consider other factors when controlling delay and initiation of automatic playing of a video displayed in a user interface. In an aspect, auto-play component 106 determines whether to delay or initiate automatic playing of a video based on visibility of the video, each time a new video is presented/displayed in a user interface. However, in some aspects, multiple videos can be grouped into a single playlist. For example, a user can open a first video associated with a playlist of videos configured to automatically play in a series. According to this example, auto-play component 106 can be configured to delay/initiate automatic playing of the first video in the playlist based on visibility of the first video. However, auto-play component 106 can continue to allow automatic playing of the other videos in the playlist following the first video, regardless of whether the other videos are visible or not.

Figure 2:
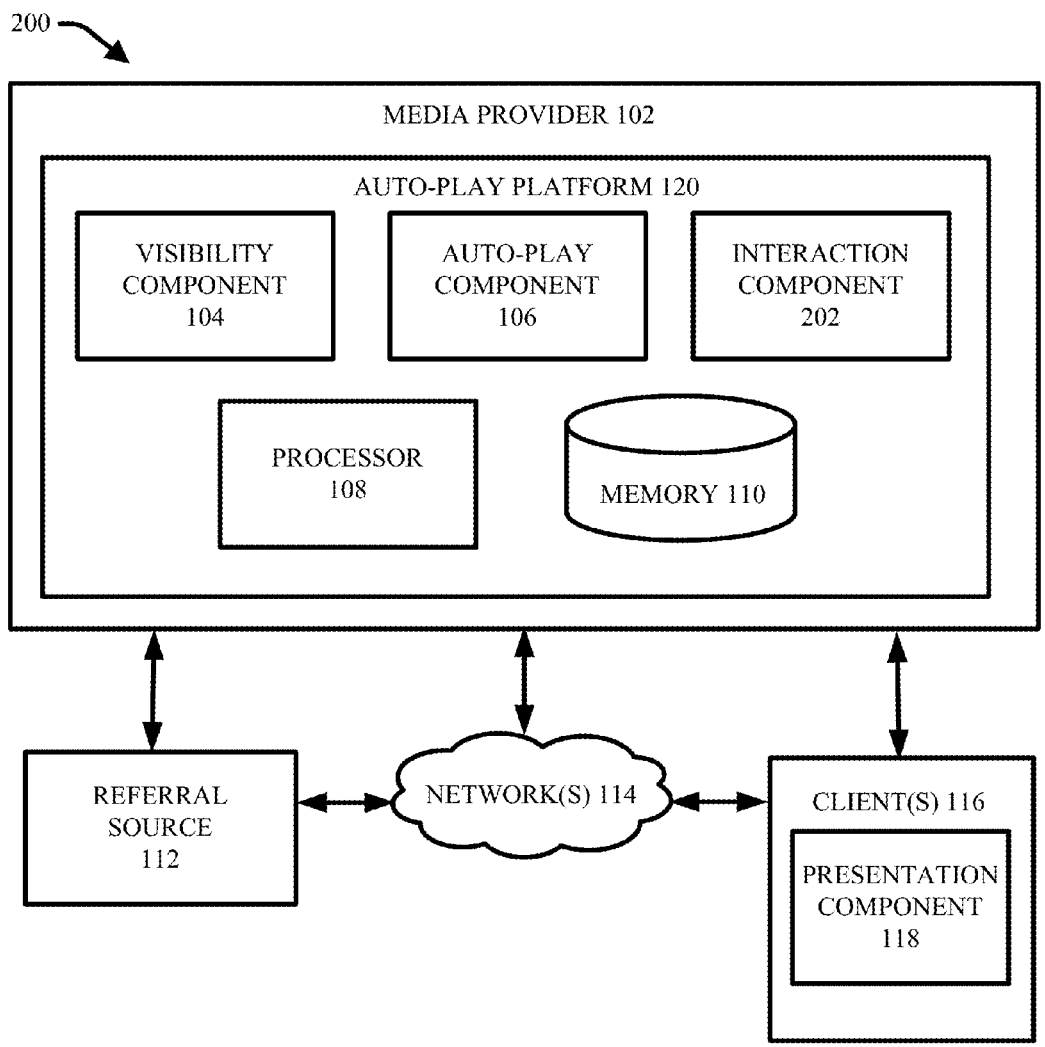
FIG. 2 illustrates another example system for delaying automatic playing of a video based on visibility of the video in accordance with various aspects and embodiments described herein.

FIG. 2 presents a diagram of another example system 400 for delaying automatic playing of a video based on visibility of the video in accordance with various aspects and embodiments described herein. System 200 includes same features and functionalities of system 100 with the addition of interaction component 202. Repetitive description of like elements employed in respective embodiments of systems and interfaces described herein are omitted for sake of brevity.

Interaction component 202 is configured to monitor and/or receive information related to user interaction with a user interface at which a video or representation of a video is displayed. In an aspect, interaction component 202 determines a level of user interaction with the user interface based on various factors indicative of user interaction with the user interface. Level of user interaction with a user interface can directly or indirectly reflect a user's engagement with the user interface and possibly a video displayed in the user interface. For example, based on tracked cursor movement, interaction component 202 can determine whether a user is idle or active with respect to interacting with the user interface. According to this aspect, auto-play component 106 is further configured to delay or initiate automatic playing of a video displayed in the user interface based on level of user interaction with the user interface, as determined by interaction component 202. For example, auto-play component 106 can be configured to delay automatic playing of video in response to level of user interaction being below a threshold value and initiate automatic playing of a video in response to level of user interaction being above a predetermined threshold value.

In another aspect, interaction component 202 can facilitate visibility component 104 with respect to determining or inferring degree of visibility of a video or representation of a video based on user interaction information associated with a window or tab panel in which a video or representation of a video is displayed. Auto-play component 106 further delays or initiates automatic playing of the video based on the degree of visibility.

In an aspect, interaction component 202 can determine or infer level of user interaction associated with a window or tab panel in which a video or representation of a video is displayed in a user interface. Interaction component 202 can also determine or infer level of user interaction associated with a video player included in a window or tab panel of a user interface in which a video or representation of the video is displayed. Visibility component 104 can employ this interaction information to determine a level of visibility of a video or representation of a video. For example, interaction component 202 can determine that cursor movement, as influenced by a user, is associated with a window or tab panel in which a video or representation of a video. Based on this curser movement, visibility component 104 can determine that the user is viewing the window or tab panel in which the video or representation of the video is displayed, thus providing an indication that the video or representation of the video is visible to the user.

Interaction component 202 can employ a variety of information to determine level of user interaction with a user interface and/or user interaction with an area of a user interface including a video or representation of the video. In an aspect, interaction component 202 can track cursor movement about a user interface to determine where the cursor is located with respect to windows, tabs, and/or video players displayed at the user interface and whether the cursor is idle or moving. In an aspect, when a cursor rests or stops at a window, tab panel or video player, this information can indicate that the window, tab panel, or video player is visible to the user.

Interaction component 202 can further collect and analyze information regarding user's physical presence at or near a client device 116 at which a user interface is displayed to determine level of user interaction with the user interface. For example, interaction component 202 can monitor the location of a user with respect the client device 116, the location of a user's hand with respect to an interfacing tool such as a mouse or keyboard, a user's posture, and/or the direction of a user vision (e.g., as discussed infra with respect to FIG. 3). According to this aspect, the interaction component can receive information from one or more sensory devices associated with a client device that is configured to sense information regarding user physical presence. For example, a client device 116 can utilize a camera, an acoustic sensor, an optical sensor, or a thermal sensor, to gather information regarding user physical presence at or near the client device.

In another aspect, interaction component 202 can track user input commands associated with selection and manipulation of windows and tab panels displayed in a user interface in which a video or representation of a video is displayed. Visibility component 104 can employ this information to facilitate determining configuration of windows and tab panels displayed at the user interface. For example, interaction component 202 can track selection of a tab by a user that results in bringing of the tab to the forefront of the user interface. Similarly, based on received input commands, interaction component 202 can detect when a user minimizes or maximizes a window, when and where a user moves a window, re-sizing of a window, or magnification/de-magnification of the material displayed in a window or tab panel.

Figure 3:
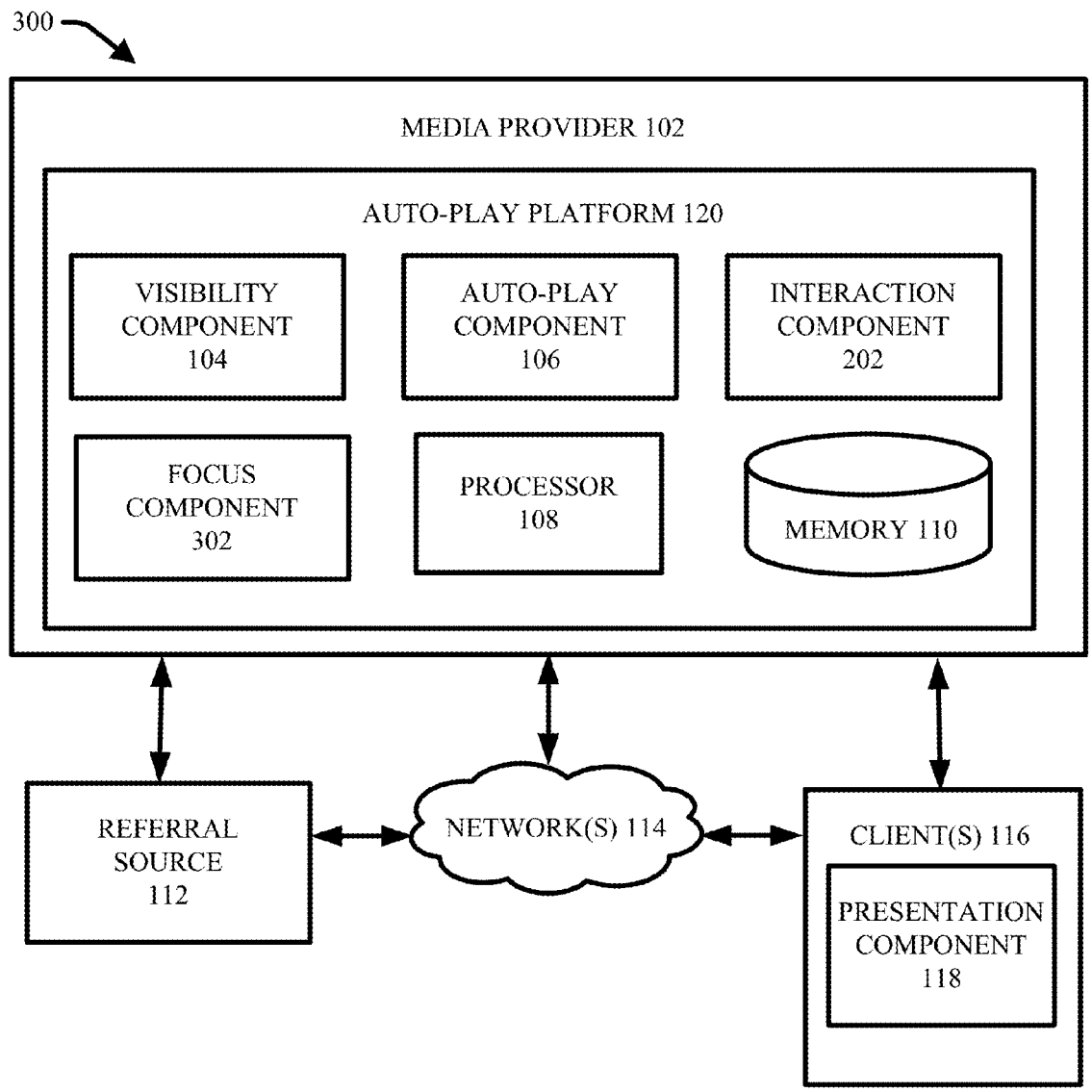
FIG. 3 illustrates another example system for delaying automatic playing of a video based on visibility of the video in accordance with various aspects and embodiments described herein.

FIG. 3 presents a diagram of another example system 300 for delaying automatic playing of a video based on visibility of the video in accordance with various aspects and embodiments described herein. System 300 includes same features and functionalities of system 200 with the addition of focus component 302. Repetitive description of like elements employed in respective embodiments of systems and interfaces described herein are omitted for sake of brevity.

Focus component 302 is configured to determine a visual focal point or focus area of a user at a user interface generated at a client device 116. In particular, focus component 302 can determine a point or area on a user interface that a user is focused upon based on information received from a focal detection device or sensor associated with client device 116 at which the interface is generated. In an aspect, visibility component 104 can employ this information to facilitate determining degree of visibility of the video or representation of the video. For example, focus component 302 can receive information that indicates a user is focusing at or near an upper right corner of a user interface. Visibility component 104 can determine (using various parameters and techniques described herein) that a window including a video is displayed in the upper right corner of the user interface. Accordingly, visibility component 104 can determine that the video is likely visible to the user (e.g., that the video is associated with a high degree of visibility) based in part on the information related to the user's visual focal point.

In another aspect, visibility component 104 can determine when a user is focused at a video or representation of a video based on received visual focus information for a user. For example, visibility component 104 and determine that an embedded video player including a video is located within a visible window of a user interface at or near coordinate (−5,−6) of the user interface, based in part on analysis of the user interface. Focus component 302 can further receive information indicating that a user is focused at or near coordinate (−5,−6) of the user interface. Accordingly, visibility component 104 can determine that the user if focused at the embedded video player include the video. In an aspect, in response to a determination that a user if focused at a video or representation of a video, auto-play component 106 can initiate automatic playing of the video.

Figure 4:
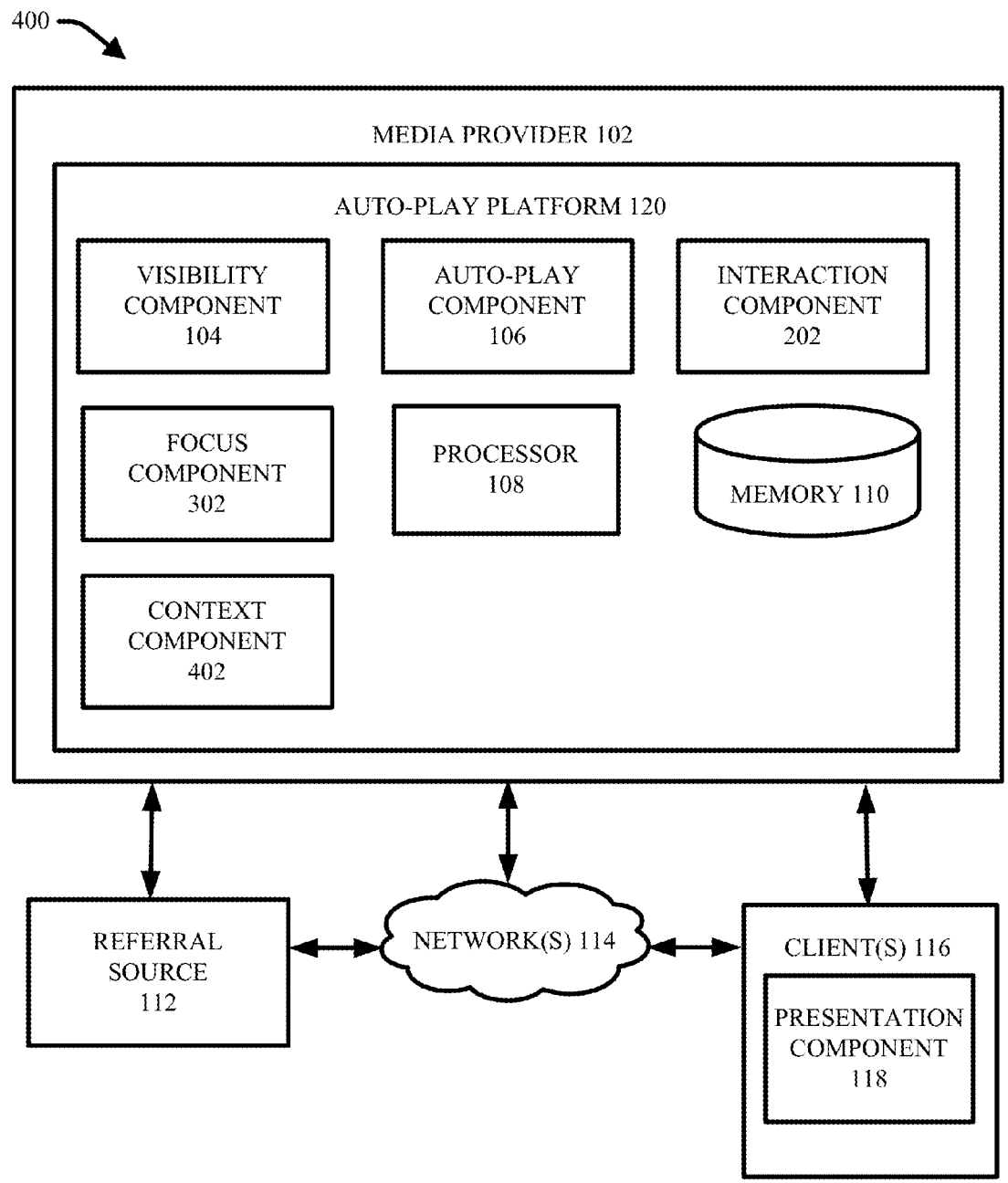
FIG. 4 illustrates another example system for delaying automatic playing of a video based on visibility of the video in accordance with various aspects and embodiments described herein.

FIG. 4 presents a diagram of another example system 400 for delaying automatic playing of a video based on visibility of the video in accordance with various aspects and embodiments described herein. System 400 includes same features and functionalities of system 300 with the addition of context component 402. Repetitive description of like elements employed in respective embodiments of systems and interfaces described herein are omitted for sake of brevity.

Context component 402 is configured to determine a context of a user, or client device 116 employed by the user, at which a user interface including a video or representation of a video is display. In an aspect, auto-play component 106 can delay and initiate automatic playing of a video based on user or client device context. For example, context component 402 can determine that a client device 116 is located in a classroom while class is in session. Although visibility component 104 may have determined that a video presented at the client device 116 is visible to the user, auto-play component 106 can determine that automatic playing of the video is inappropriate for the classroom context. Thus auto-play component 106 can delay automatic playing of the video until the context changes and becomes appropriate for automatic playing of the video.

Context component 402 can employ various techniques to determine client device context. In an aspect, in order to determine or infer client device context, context component 402 can receive and analyze information including but not limited to: client device 116 location, time of day, scheduled events, user schedule, and user age. In some aspects, context component 402 can receive sensory information gathered by the client device 116 to determine context. For example, context component 402 can receive and analyze images, video or audio captured by client device 116 depicting a current environment of the client device.

Figure 5:
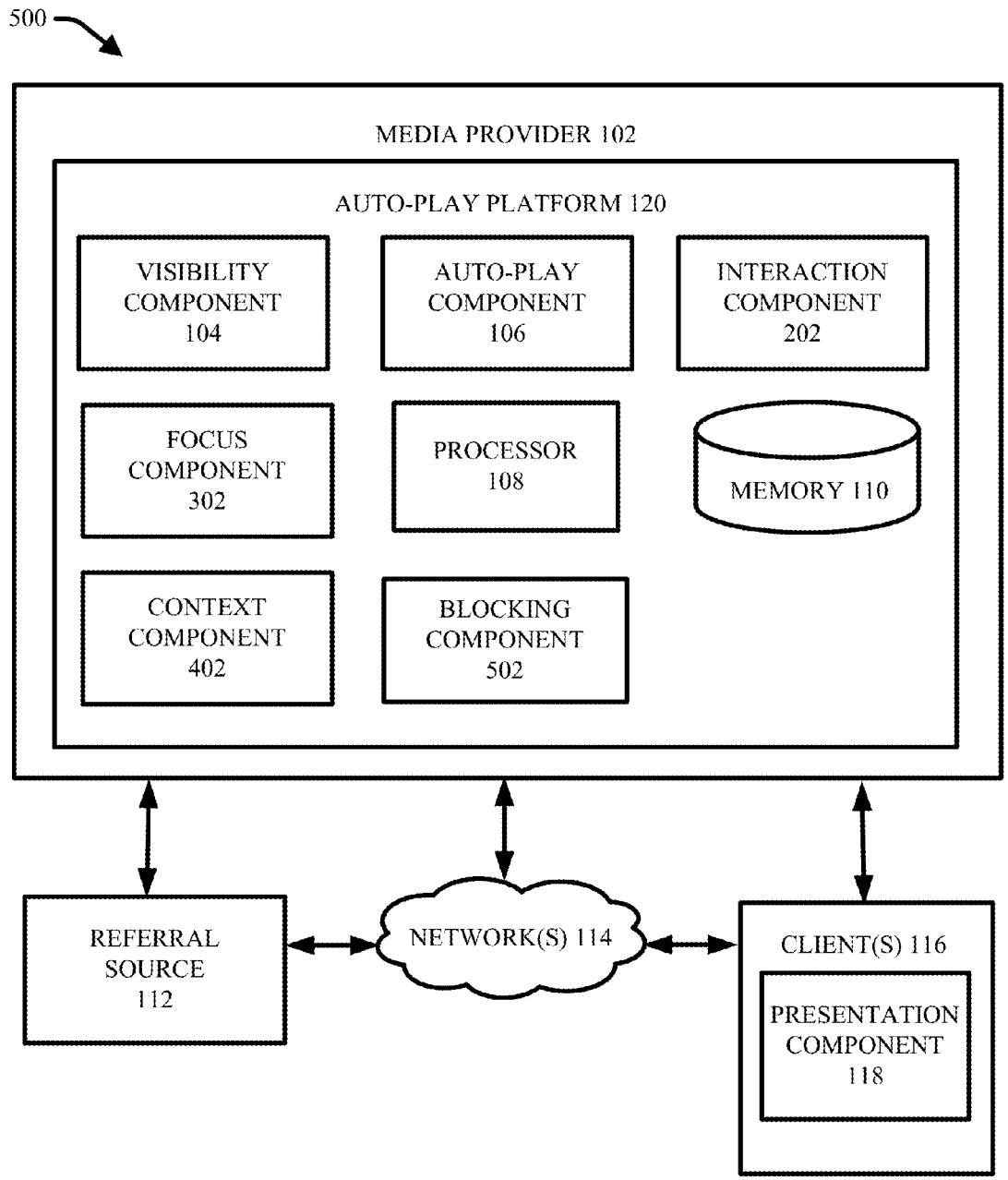
FIG. 5 illustrates another example system for delaying automatic playing of a video based on visibility of the video in accordance with various aspects and embodiments described herein.

FIG. 5 presents a diagram of another example system 500 for delaying automatic playing of a video based on visibility of the video in accordance with various aspects and embodiments described herein. System 500 includes same features and functionalities of system 400 with the addition of blocking component 502. Repetitive description of like elements employed in respective embodiments of systems and interfaces described herein are omitted for sake of brevity.

Blocking component 502 is configured to facilitate blocking automatic playing of visible videos by auto-play component 106 based on declared or inferred user preferences. For example, blocking component 502 is configured to block automatic playing of videos that include inappropriate content based on a user's age or preferences. According to this example, blocking component 502 can determine that a video containing violent content should be blocked from automatic playing for users under the age of 7. In response to a determination that automatic playing of a video should be blocked, auto-play component 106 can delay automatic playing of the video, despite a determination that the video is visible and/or automatic playing is appropriate given the user's context.

In an aspect, a user can provide blocking component 502 information regarding preferences for blocking automatic playing of videos. For example, a user can provide blocking component 502 information indicating what type of content they would liked blocked (e.g., vulgar or racy content, violent content, etc.). In another example, a user can provide blocking component 502 preference information regarding blocking automatic playing based on certain contexts. According to this example, a user could prefer to have automatic playing of videos blocked when the user is at work or school. Blocking component 502 can apply user preferences when determining whether automatic playing of a video is appropriate. In response to a determination that automatic playing of a video is not appropriate given a user's preferences, blocking component 502 can inform auto-play component 106 to delay automatic playing of a video.

Figure 6:
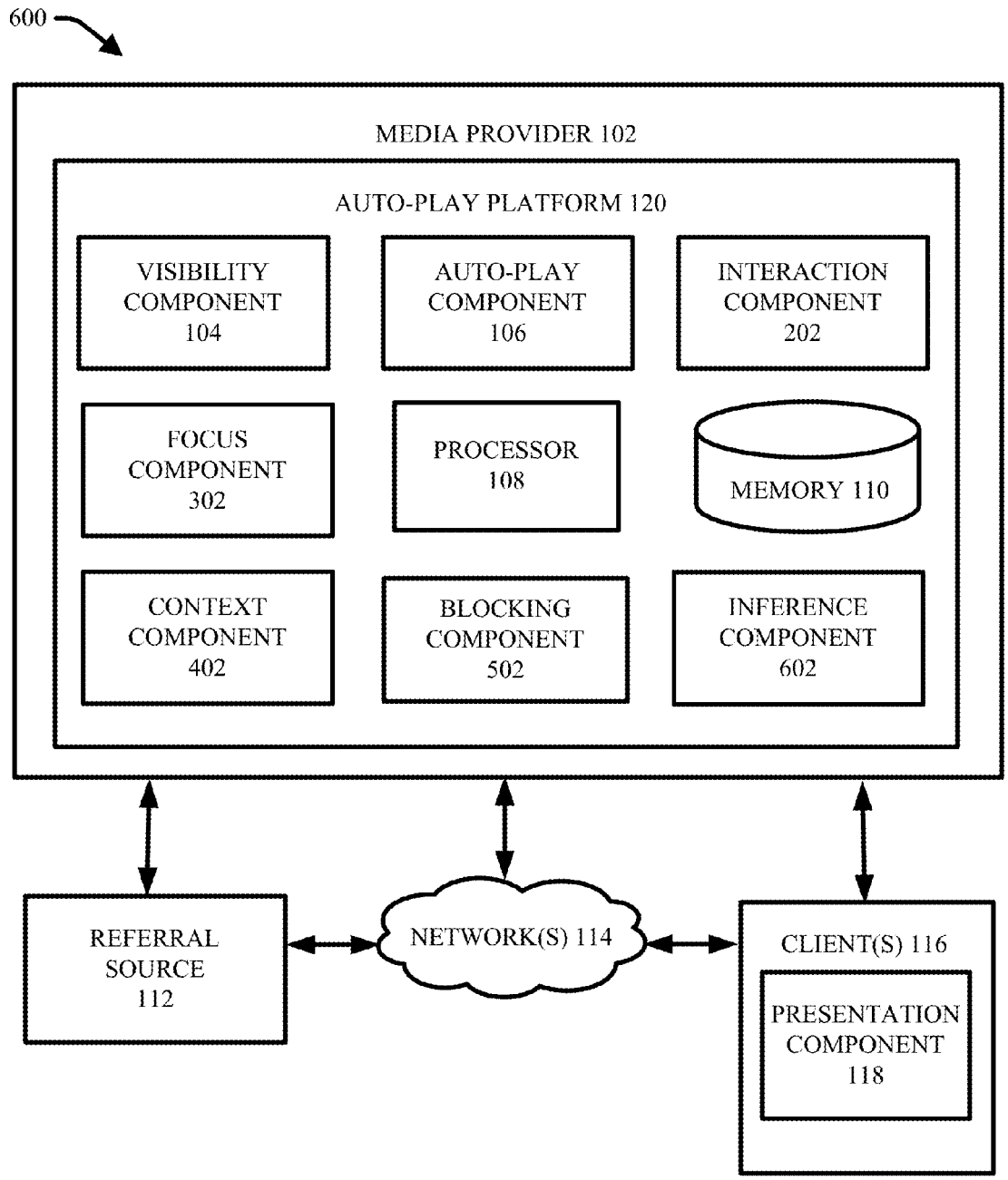
FIG. 6 illustrates another example system for delaying automatic playing of a video based on visibility of the video in accordance with various aspects and embodiments described herein.

FIG. 6 presents a diagram of another example system 600 for delaying automatic playing of a video based on visibility of the video in accordance with various aspects and embodiments described herein. System 600 includes same features and functionalities of system 500 with the addition of inference component 602. Repetitive description of like elements employed in respective embodiments of systems and interfaces described herein are omitted for sake of brevity.

Inference component 602 is configured to provide for or aid in various inferences or determinations associated with aspects of visibility component 104, auto-play component 106, interaction component 202, focus component 302, context component 402 and blocking component 502. In an aspect, all or portions of auto-play platform 120 can be operatively coupled to inference component 602. Moreover, inference component 602 can be granted access to all or portions of media provider 102, referral source 112, networks 114 and client device 116.

In an aspect, inference component 602 can facilitate inferring degree of visibility of a video or representation of a video based at least in part on the various factors discussed herein. Inference component 602 can further facilitate interaction component 202 with respect to inferring level of user interaction with a user interface and/or whether the user interaction is associated with a window and/or tab panel in which a video or representation of a video is presented. Inference component 602 can also facilitate auto-play component when inferring whether to delay or initiate automatic playing of a video based on user interaction data associated with a user interface. In another aspect, inference component 602 can facilitate focus component 302 by inferring whether a user is focused upon a video or representation of a video. Inference component 602 can also facilitate context component 402 with respect inferring user context and inferring whether the context is appropriate for automatic playing of a video. Inference component 602 can similarly facilitate blocking component 502 by inferring whether a user particular video should be blocked for automatic playing based on user preferences, demographics, and/or other information associated with the user (e.g., parental control implementations).

In order to provide for or aid in the numerous inferences described herein, inference component 602 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, such as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
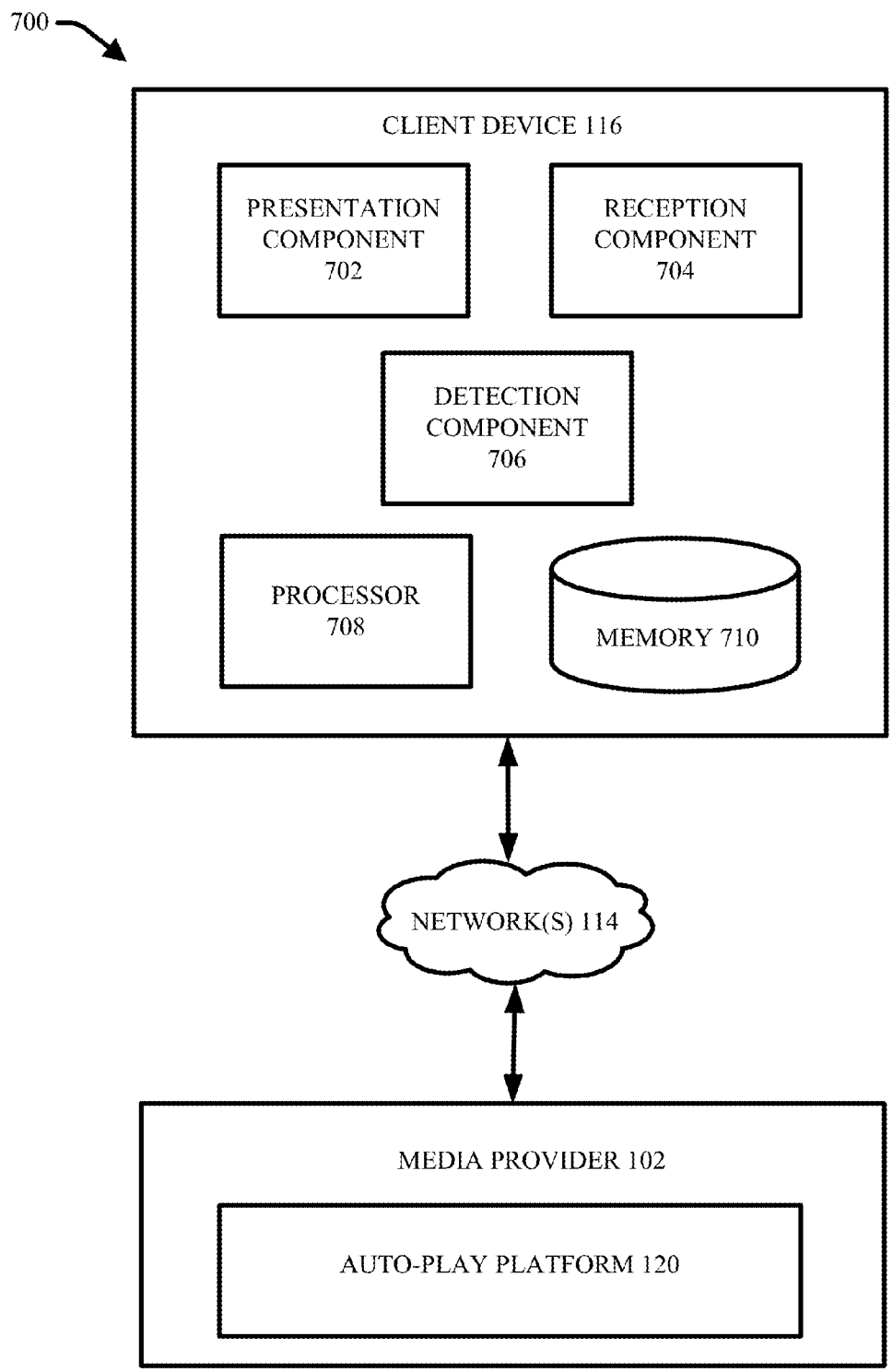
FIG. 7 illustrates another example system for delaying automatic playing of a video based on visibility of the video in accordance with various aspects and embodiments described herein.

FIG. 7 presents a diagram of an example system 700 for delaying automatic playing of a video based on visibility of the video in accordance with various aspects and embodiments described herein. System 700 includes same features and functionalities of previous systems described herein. Repetitive description of like elements employed in respective embodiments of systems and interfaces described herein are omitted for sake of brevity.

Similar to previous described systems, system 700 includes media provider 102, auto-play platform 120, network(s) 114, and client device 116. System 700 exemplifies various features and functionalities of client device 116. Client device 116 includes presentation component 702, reception component 704, and detection component 706. Client device 116 includes memory 710 for storing computer executable components and instructions. Client device 116 further includes a processor 708 to facilitate operation of the instructions (e.g., computer executable components and instructions) by client device 116.

Presentation component 702 can include features and functionalities described with reference to presentation component 118. For example, presentation component 702 can generate and present a user interface at client device 116 that organizes and presents one or more windows and tab panels that display content and/or applications to a user. In an aspect, presentation component 702 can employ a browser to facilitate generating a user interface that displays webpages in windows and/or tab panels. For example, a window or tab panel of a window can include a webpage that includes video or representation of a video. Reception component 704 is configured to receive media streamed from media provider 102 via a network.

Detection component 706 is configured to detect and receive information regarding user interaction with client device. Detection component 706 can include hardware and/or software that facilitates capturing user signals at client device 116 related to interaction with a user interface generated at the client device. For example, detection component 706 can include an input device (e.g., a mouse, a touch screen, a motion sensor, a proximity sensor, a gaze detection device, etc.) and/or software that analyzes an action captured by the input device to determine either an intention of the action (e.g., select, move, etc.) or an object on the user interface (e.g., window, tab panel, video player, video or representation of the video etc.) which the action is directed. Detection component 706 can provide any captured information signals related to user interaction and focus with respect to a user interface to auto-play platform 120.

Figure 8:
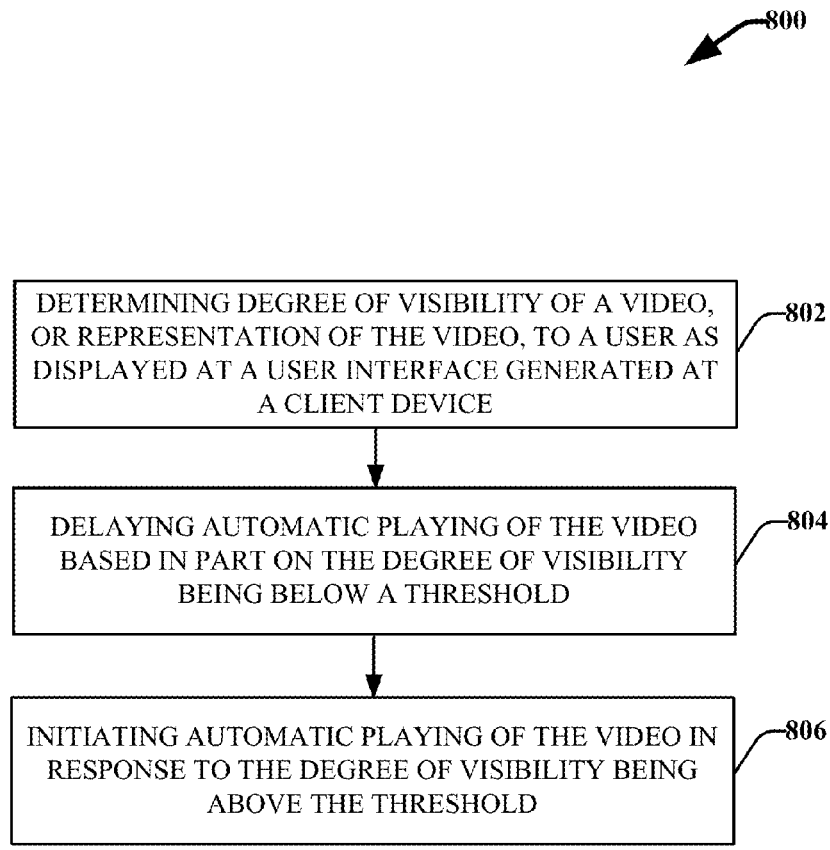
FIG. 8 is a flow diagram of an example method for delaying automatic playing of a video based on visibility of the video in accordance with various aspects and embodiments described herein.
Figure 9:
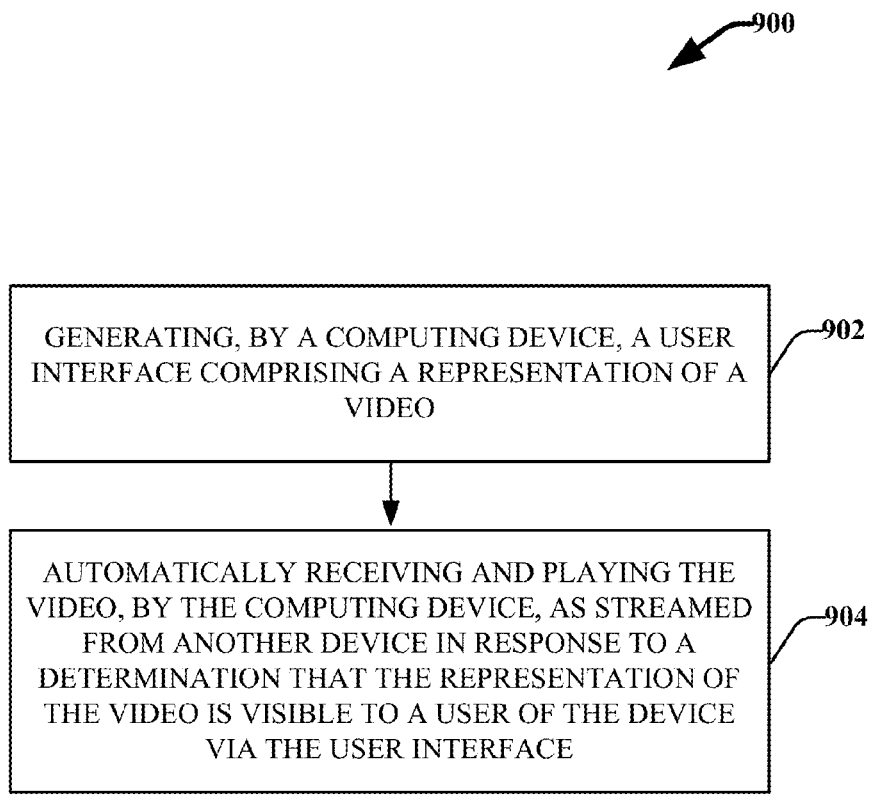
FIG. 9 is a flow diagram of another example method for delaying automatic playing of a video based on visibility of the video in accordance with various aspects and embodiments described herein.

In view of the example systems and/or devices described herein, example methods that can be implemented in accordance with the disclosed subject matter can be further appreciated with reference to flowcharts in FIGS. 8-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 8 illustrates a flow chart of an example method 800 for delaying automatic playing of a video based on visibility of the video, in accordance with aspects described herein. At 802, degree of visibility of a video, or representation of the video, to a user as displayed in a user interface generated at a client device, is determined (e.g., using visibility component 104). At 804, automatic playing of the video based in part on the degree of visibility being below a threshold (e.g., using auto-play component 106). At 806, automatic playing of the video is initiated in response to the degree of visibility being above the threshold (e.g., using auto-play component 106).

FIG. 9 illustrates a flow chart of another example method 900 for delaying automatic playing of a video based on visibility of the video, in accordance with aspects described herein. At 902, a user interface comprising a representation of a video is generated by a computing device (e.g., using presentation component 118 or 702). At 904, the computing device automatically receives and plays the video as streamed from another device in response to a determination that the representation of the video is visible to a user of the device via the user interface (e.g., using reception component 704).

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 10:
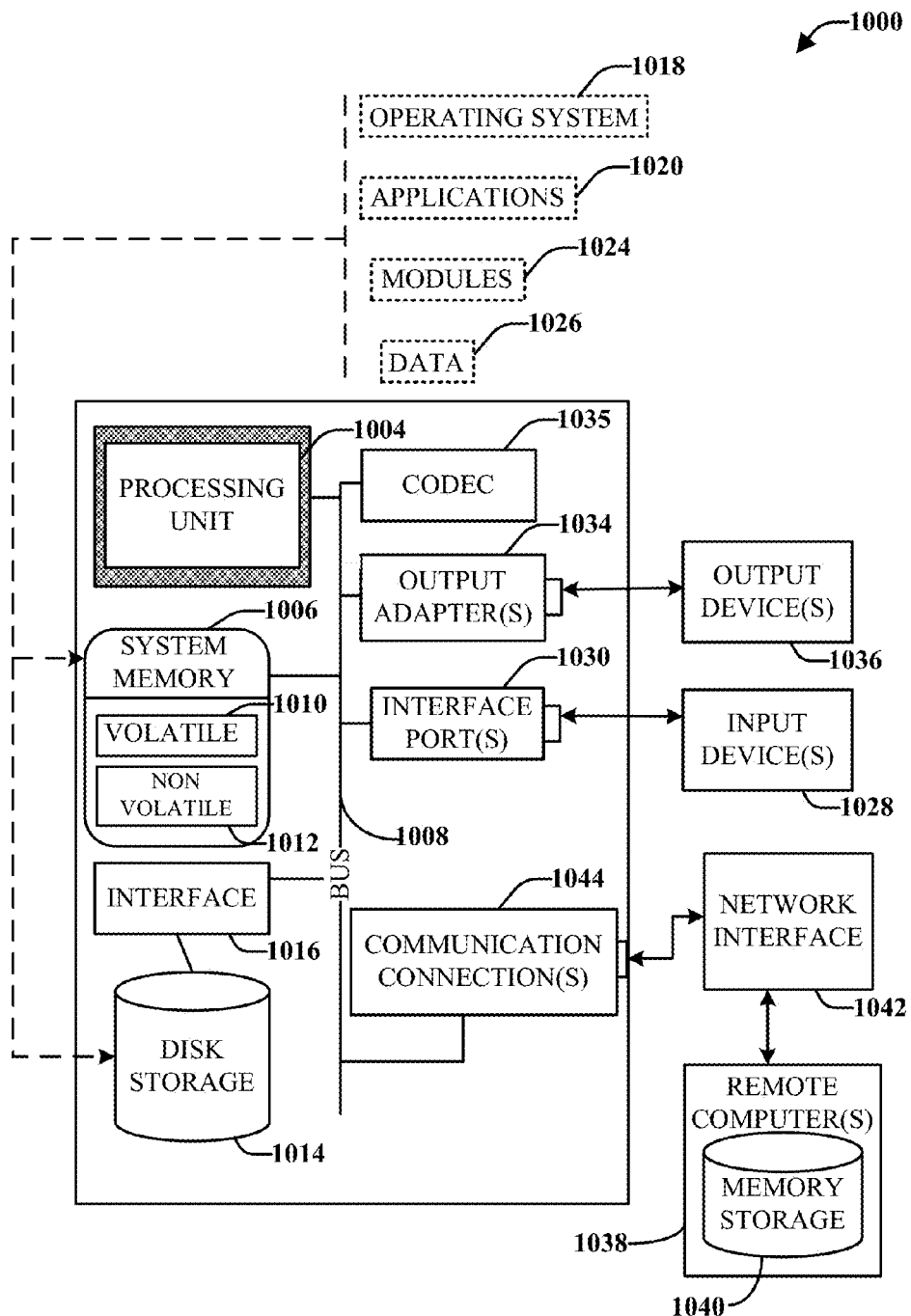
FIG. 10 is a schematic block diagram illustrating a suitable operating environment in accordance with various aspects and embodiments.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13104), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1005 may include at least one of an encoder or decoder, wherein the at least one of an encoder or decoder may consist of hardware, a combination of hardware and software, or software. Although, codec 1005 is depicted as a separate component, codec 1005 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s). Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
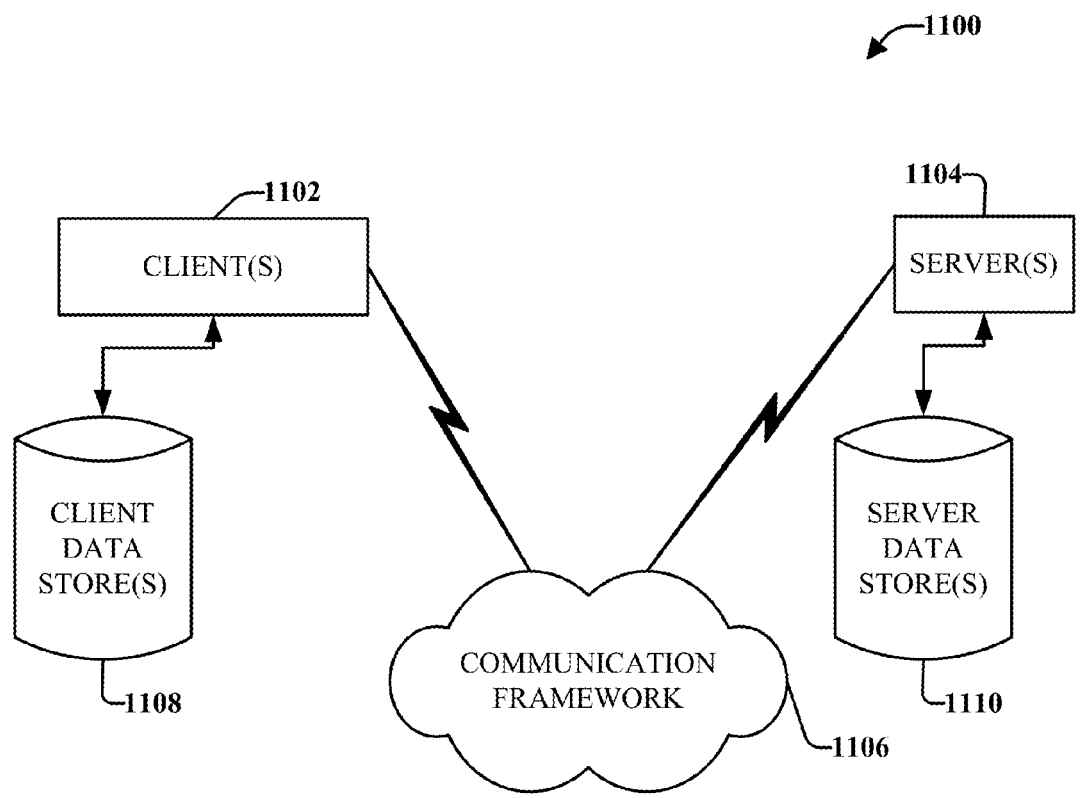
FIG. 11 is a schematic block diagram of a sample-computing environment in accordance with various aspects and embodiments.

Referring now to FIG. 11, there is illustrated a schematic block diagram of a computing environment 1100 in accordance with this disclosure. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a metadata, e.g., associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 include or are operatively connected to one or more client data store(s) 1108 that can be employed to store information local to the client(s) 1102 (e.g., associated contextual information). Similarly, the server(s) 1104 are operatively include or are operatively connected to one or more server data store (s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
a memory having stored thereon computer executable components;
a processor that executes at least the following computer executable components:
a visibility component configured to determine a degree of visibility of a video or representation of the video to a user as displayed in a user interface, wherein the video is configured for automatic playing in response to opening of a window or tab of the user interface in which the video is included;
a focus component configured to determine a direction of vision of the user with respect to the video or representation of the video as displayed in the user interface; and
an auto-play component configured to delay the automatic playing of the video based in part on a determination that the degree of visibility is below a threshold and a determination that the user in not focused upon the video or representation of the video based on the direction of vision of the user;
a context component configured to receive input from the user defining contexts in which the automatic playing of the video is appropriate or inappropriate, and infer or determine a context in connection with display of the video or the representation of the video in the user interface based on at least one of: a location of the client device, a time of day, or a schedule of the user; and
wherein the auto-play component is further configured to delay or initiate the automatic playing of the video based in part on the context.

2. The system of claim 1, wherein the auto-play component is further configured to initiate the automatic playing of the video in response to a determination that the degree of visibility is above the threshold and a determination that the user is focused upon the video or representation of the video based on the direction of vision of the user.

3. The system of claim 2, wherein the video is included in a playlist and wherein the auto-play component is configured to automatically initiate playing of another video in the playlist after completion of playing of the video regardless of a degree of visibility of the other video.

4. The system of claim 1, wherein the video or representation of the video is provided in a first window of the user interface and the visibility component is configured to determine the degree of visibility as a function of location of the first window with respect to another window open in the user interface.

5. The system of claim 1, wherein the video or representation of the video is provided in a first tab panel of a window of the user interface and the visibility component is configured to determine the degree of visibility as a function of location of the first tab panel with respect to another tab panel open in the window.

6. The system of claim 1, wherein the video or representation of the video is provided in an embedded player and the visibility component is configured to determine the degree of visibility as a function of a size of the of the embedded player in the user interface, wherein the size of the embedded player is based on a level of magnification of the user interface.

7. The system of claim 1, further comprising an interaction component configured to determine a physical location of the user with respect to the user interface based on sensory information captured at the client device, wherein the auto-play component is configured to delay the automatic playing of the video based in part on a determination that the user is not located at or near the client device.

8. The system of claim 1, wherein the video comprises an audio portion and a video portion, and wherein the auto-play component is configured to initiate automatic playing of only the audio portion in response to the degree of visibility being below the threshold and the determination that the user is not focused upon the video or representation of the video.

9. A method comprising:
determining, by a system including a processor, degree of visibility of a video, or representation of the video, to a user as displayed in a user interface, wherein the video is configured for automatic playing in response to opening of a window or tab of the user interface in which the video is included;
determining, by the system, a direction of vision of the user with respect to the video or representation of the video as displayed in the user interface;
receiving, by the system, input from the user defining contexts in which the automatic playing of the video is appropriate or inappropriate;
determining, by the system, a context in connection with display of the video or the representation of the video in the user interface based on at least one of: a location of the client device, a time of day, or a schedule of the user;
delaying, by the system, the automatic playing of the video based in part on a determination that the degree of visibility is below a threshold, a determination that the user in not focused upon the video or representation of the video based on the direction of vision of the user, and the context, or initiating the automatic playing of the video based on the context.

10. The method of claim 9, further comprising initiating the automatic playing of the video in response to a determination that the degree of visibility is above the threshold and a determination that the user is focused upon the video or representation of the video based on the direction of vision of the user.

11. The method of claim 10, wherein the video is included in a playlist, the method further comprising:
automatically initiating playing of another video in the playlist after completion of playing of the video regardless of a degree of visibility of the other video.

12. The method of claim 9, wherein the video or representation of the video is provided in a first window of the user interface and wherein the determining comprises determining the visibility of the video, or representation of the video, as a function of location of the first window with respect to another window open in the user interface.

13. The method of claim 9, wherein the video or representation of the video is provided in a first tab panel of a window of the user interface and wherein the determining comprises determining the visibility of the video, or representation of the video, as a function of location of the first tab panel with respect to another tab panel open in the window.

14. The method of claim 9, wherein the video or representation of the video is provided in an embedded player and the determining the degree of visibility comprises determining the degree of visibility as a function of a size of the of the embedded player in the user interface, wherein the size of the embedded player is based on a level of magnification of the user interface.

15. A non-transitory computer-readable medium having instructions stored thereon that, in response to execution, cause a system including a processor to perform operations comprising:
  determining degree of visibility of a video or representation of the video to a user as displayed in a user interface, wherein the video is configured for automatic playing in response to opening of a window or tab of the user interface in which the video is included;
  determining a direction of vision of the user with respect to the video or representation of the video as displayed in the user interface; and
  receiving input from the user defining contexts in which the automatic playing of the video is appropriate or inappropriate;
  determining a context in connection with display of the video or the representation of the video in the user interface based on at least one of: a location of the client device, a time of day, or a schedule of the user;
  delaying the automatic playing of the video based in part on a determination that the degree of visibility is below a threshold, a determination that the user in not focused upon the video or representation of the video based on the direction of vision of the user, and the context, or initiating the automatic playing of the video based on the context.

16. The non-transitory computer-readable medium of claim 15, further comprising capturing camera information that indicates the direction of vision of the user.

17. The non-transitory computer-readable medium of claim 15, wherein the video comprises an audio portion and a video portion, and further comprising initiating automatic playing of only the audio portion in response to the degree of visibility being below the threshold and the determination that the user is not focused upon the video or representation of the video.

18. A system, comprising:
  a memory having stored thereon computer executable components;
  a processor that executes at least the following computer executable components:
    a visibility component configured to determine degree of visibility of a video or representation of the video to a user as displayed in a user interface, wherein the video is configured for automatic playing in response to opening of a window or tab of the user interface in which the video is included, wherein the video or representation of the video is provided in an embedded player and the visibility component is further configured to determine the degree of visibility as a function of a size of the embedded player in the user interface, wherein the size of the embedded player is based on a level of magnification of the user interface;
    a focus component configured to determine a direction of vision of the user with respect to the video or representation of the video as displayed in the user interface; and
    an auto-play component configured to delay the automatic playing of the video based in part on a determination that the degree of visibility is below a threshold and a determination that the user in not focused upon the video or representation of the video based on the direction of vision of the user.

19. A method comprising:
  determining, by a system including a processor, degree of visibility of a video or representation of the video to a user as displayed in a user interface, wherein the video is configured for automatic playing in response to opening of a window or tab of the user interface in which the video is included, wherein the video or representation of the video is provided in an embedded player and the determining the degree of visibility comprises determining the degree of visibility as a function of a size of the embedded player in the user interface, wherein the size of the embedded player is based on a level of magnification of the user interface;
  determining, by the system, a direction of vision of the user with respect to the video or representation of the video as displayed in the user interface;
  delaying, by the system, the automatic playing of the video based in part on a determination that the degree of visibility is below a threshold and a determination that the user in not focused upon the video or representation of the video based on the direction of vision of the user.

* * * * *